US007750966B2

(12) United States Patent
Horie

(10) Patent No.: US 7,750,966 B2
(45) Date of Patent: Jul. 6, 2010

(54) CAMERA WITH FRAMING MEANS

(75) Inventor: Kenichi Horie, Machida (JP)

(73) Assignee: Olympus Corporation, Tokyo (JP)

( * ) Notice: Subject to any disclaimer, the term of this patent is extended or adjusted under 35 U.S.C. 154(b) by 953 days.

(21) Appl. No.: 10/947,057

(22) Filed: Sep. 22, 2004

(65) Prior Publication Data

US 2005/0122401 A1 Jun. 9, 2005

(30) Foreign Application Priority Data

Oct. 15, 2003 (JP) ............................. 2003-355591

(51) Int. Cl.
*H04N 5/222* (2006.01)
(52) U.S. Cl. ................................. 348/333.01
(58) Field of Classification Search ............. 348/333.01
See application file for complete search history.

(56) References Cited

U.S. PATENT DOCUMENTS

| 5,252,950 | A |   | 10/1993 | Saunders et al. |         |
|-----------|---|---|---------|-----------------|---------|
| 5,335,035 | A | * | 8/1994  | Maeda           | 396/51  |
| 5,583,606 | A |   | 12/1996 | Shindo et al.   |         |
| 5,627,621 | A | * | 5/1997  | Kodama          | 396/373 |
| 5,839,000 | A | * | 11/1998 | Davis et al.    | 396/51  |
| 6,118,484 | A | * | 9/2000  | Yokota et al.   | 348/350 |
| 6,424,376 | B1 | * | 7/2002 | Hirasawa        | 348/333.03 |
| 6,522,360 | B1 | * | 2/2003 | Miyawaki et al. | 348/347 |

FOREIGN PATENT DOCUMENTS

| JP | 05-282429   | 10/1993 |
| JP | 11-263145   | 9/1999  |
| JP | 2000-101898 | 4/2000  |
| JP | 2001-281520 | 10/2001 |
| JP | 2003-195145 | 7/2003  |

OTHER PUBLICATIONS

Second Office Action (Notice of Examiner's Reasons for Rejection) for Chinese Patent Application No. 200410084116.4, mailed Nov. 21, 2008 (4 pgs.) with translation (2 pgs.).
Office Action for Japanese Patent Application No. 2003-355591, mailed Jan. 12, 2010 (4 pgs.).
Office Action for Japanese Patent Application No. 2003355591, mailed Apr. 6, 2010 (4 pgs.).

* cited by examiner

*Primary Examiner*—James M Hannett
(74) *Attorney, Agent, or Firm*—Straub & Pokotylo; John C. Pokotylo

(57) ABSTRACT

The camera according to this invention comprises an L-shaped frame that is capable of changing the size or aspect ratio of the viewfinder by relative movement, a back-face image-pickup device for photographing an image of the eye of the photographer, and a photographing optical system for forming the image of the subject image to the internal CCD, analyzes the image captured by the back-face image-pickup device and calculates the distance and direction to the eye of the photographer from the center of the viewfinder, and based on the calculated information and the size or aspect ratio information of the viewfinder, the photographer performs optical zooming or shifting of the photographing optical system, or performs electronic zooming or shifting by cropping the taken image by use of the CCD, in order for the range that the photographer observed via the viewfinder to become the photographing range.

24 Claims, 14 Drawing Sheets

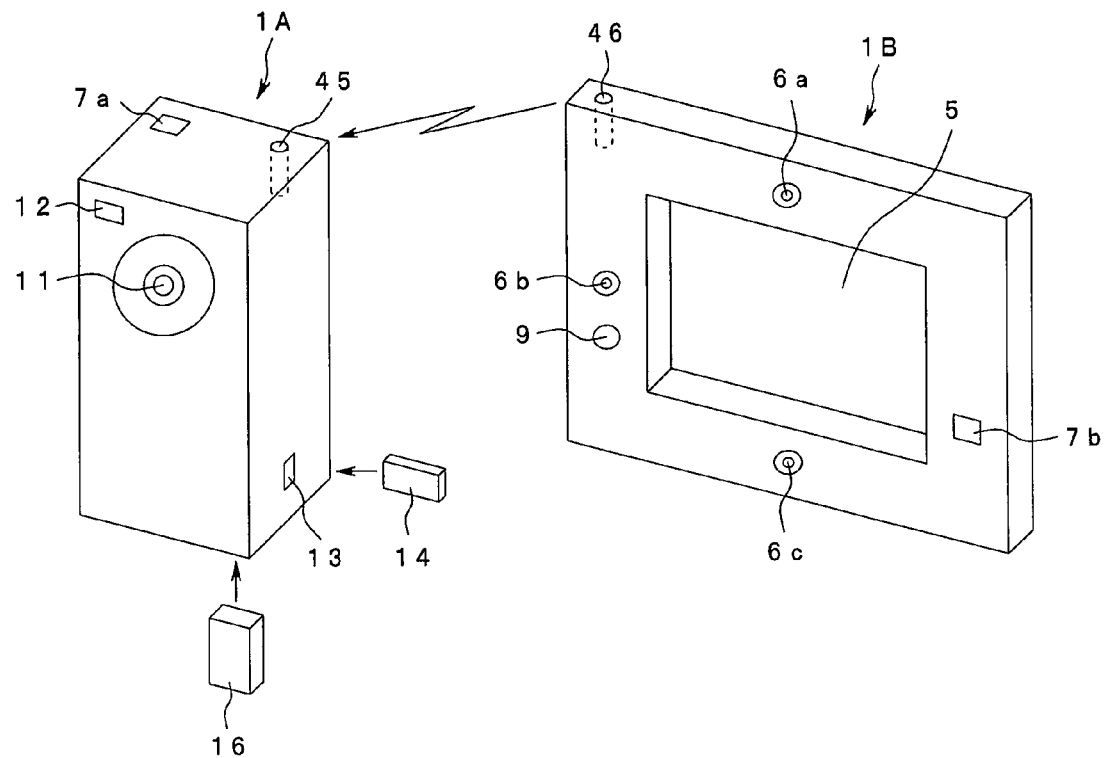

CAMERA WITH FRAMING MEANS

This application claims benefit of Japanese Application No. 2003-355591 filed in Japan on Oct. 15, 2003, the contents of which are incorporated by this reference.

BACKGROUND OF THE INVENTION

1. Field of the Invention

The present invention relates to a camera, and more specifically, relates to a camera that detects eye position and adjusts the photographing range.

2. Description of the Related Art

In general, an optical viewfinder or a liquid crystal viewfinder is used for setting a photographing range in order to determine the composition of a photograph in the case of photographing a subject using an electronic camera, a silver salt camera, a video camera, a camera function provided on a portable telephone, and so forth.

In many cases, an optical viewfinder is provided to allow observation of the image by moving the eye close to the eye side of the viewfinder optical system, and on the other hand, a liquid crystal viewfinder is made to allow observation of an image displayed on a liquid crystal display device several inches in diagonal length, from several tens of centimeters away.

The image that is observed via the above-mentioned optical viewfinder is an image formed via a viewfinder optical system, and the image that is observed via the above-mentioned liquid crystal viewfinder is an image formed via a photographing optical system, and because both images are formed via some type of optical system, the images differ from that which a photographer observes with the naked eye.

In other words, if the camera angle is changed in order to change the composition, or to follow the movement of the subject, the changes in the image in the viewfinder at that time will differ from the change observed in an image when the photographer moves his/her head and so forth to observe with the naked eye. Accordingly, the photographer will experience an awkward sensation. A photographer such as a practiced professional photographer will be accustomed to these types of sensations, and can grasp how to move the camera for the desired composition or how to follow the movements of the subject, but for a novice or a general user, overcoming these awkward sensations can be a problem.

Further, in the case of a liquid crystal finder, because the display contrast of the liquid crystal is insufficient, the contrast in the image is markedly lower than in an image observed with the naked eye or an image observed via an optical finder, and further, because the number of image frames captured within one second may not be sufficient, or because the response time of the liquid crystal may be said to be not short enough, when the camera is moved, the rewriting of the displayed images may be slow or residual images may occur, and the image may seem blurred.

Now, in the case that an artist for example wishes to paint scenery, forming an L-shape with the thumb and forefinger of the right hand, and similarly forming an L-shape with the thumb and forefinger of the left hand, and combining these two L-shapes facing each other, as illustrated in FIG. 18, configures a rectangular frame FF, and this method for determining composition by changing the aspect ratio or size of this rectangle frame FF has been used since ancient times. FIG. 18 is a diagram illustrating a situation wherein the composition is determined by using the finger frame. In the case of performing observations via the rectangle frame FF, the observation is made with the naked eye, and accordingly awkwardness felt as when observing via an above-described viewfinder is not felt.

On the other hand, Japanese Unexamined Patent Application Publication No. 2003-195145 describes a camera comprising a taking lens, a release button, distance measuring means which measure the distance between the camera body and the photographer, and control means that change the photographic parameter value of the camera based on the distance measured by this distance measuring means, and further, describes zoom movement position calculation means being provided which calculate the zoom movement position of the above-mentioned taking lens based on the distance measured by the above-mentioned distance measuring means.

Further, Japanese Unexamined Patent Application Publication No. 2001-281520 describes an optical device comprising a camera unit comprising a lens capable of changing the focal length, detecting means for detecting the condition of the eyeball, and control means for changing the focal length of the above-mentioned camera unit based on the detecting results of this detecting means. Further, an optical device is described which comprises a camera unit comprising a drive mechanism capable of changing the optical axis direction of the lens, detecting means for detecting the state of the eyeball, and control means for changing the optical axis direction of the above-mentioned camera unit based on the detecting results of the above-mentioned detecting means. Specifically, a technique is described wherein a line-of-sight detecting sensor or a crystalline lens detecting sensor is positioned in the vicinity of the eyeball of the user, and in the case that the convergence angle is small, the focal length is set to the telephoto side, and the photographing direction of the camera is set to match the direction of line of sight.

However, according to the description in the above-mentioned Japanese Unexamined Patent Application Publication No. 2003-195145, in order to confirm what range will be the photographing range when the zoom position is changed, the above-described awkwardness cannot be eliminated because of the necessity to observe the liquid crystal viewfinder and so forth. Further, because the zoom position is calculated based only on the distance between the camera body and the photographer, even if the distance between the camera body and the photographer is the same, in the case that the angle is different and so forth, the difference in the relative position cannot be employed suitably.

Further, the technique described in Japanese Unexamined Patent Application Publication No. 2001-281520 requires a high-precision and expensive detecting sensor because of the need for detecting the state of the eyeball as described above. Further, the detecting sensor must be positioned in the vicinity of the eyeball, and in the case of applying this type of technology to a camera, the subject image will have to be observed via an optical or electronic eyepiece viewfinder, but in this case, the awkwardness as described above will occur. Further, detecting the condition of the eyeball becomes difficult if the photographer has closed eyes or is wearing sunglasses, so this cannot be said to widely handle the various uses of the users.

SUMMARY OF THE INVENTION

Accordingly, it is an object of the present invention to provide a camera enabling picture-taking with a natural feeling, without feeling awkward.

Briefly, the present invention is a camera comprising: framing means for setting a two-dimensional region for defining a object range within a field of view; eye position detecting means for detecting the position of the eye relative to the framing means; a photographing optical system for forming an image of the subject image; photographing means for photographing a subject image that is formed by the photographing optical system; and photographing range adjustment means for adjusting the photographing range so that the photographing range of the photographing means approximately matches the object range observed via the two-dimensional region, based on the information of the two-dimensional region that is set by the framing means and the information of the eye position detected by the eye position detecting means.

The above and other objects, features, and advantages of the invention will become more clearly understood from the following description referring to the accompanying drawings.

BRIEF DESCRIPTION OF THE DRAWINGS

FIG. 6 is a flowchart according to the first embodiment, illustrating a summary of the operation of the camera when the power is turned on.

FIG. 13A is a perspective diagram according to a third embodiment of the present invention, from the front face side the main unit of a camera type wherein the frame unit is separated from the main unit.

FIG. 13B is a perspective diagram according to the third embodiment, from the back side the frame unit of a camera type wherein the frame unit is separated from the main unit.

FIG. 14 is a perspective diagram according to a fourth embodiment of the present invention, illustrating an example of a camera wherein the viewfinder is configured of a transmissive type display device.

DESCRIPTION OF THE PREFERRED EMBODIMENTS

The embodiments will be described below with reference to the drawings.

First Embodiment

Figure 1A:
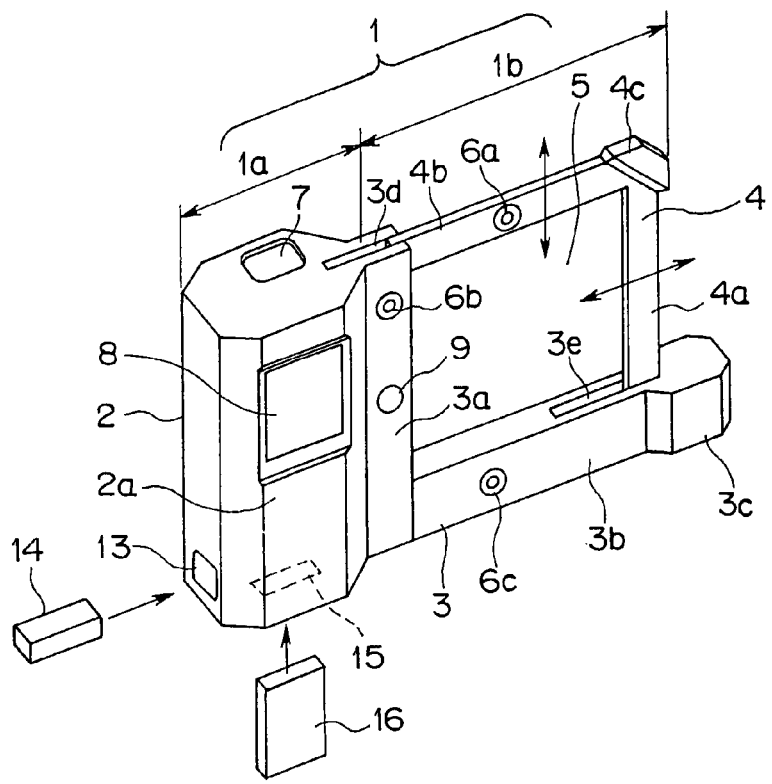
FIG. 1A is a perspective diagram illustrating the configuration of a camera from the back side according to a first embodiment of the present invention.
Figure 1B:
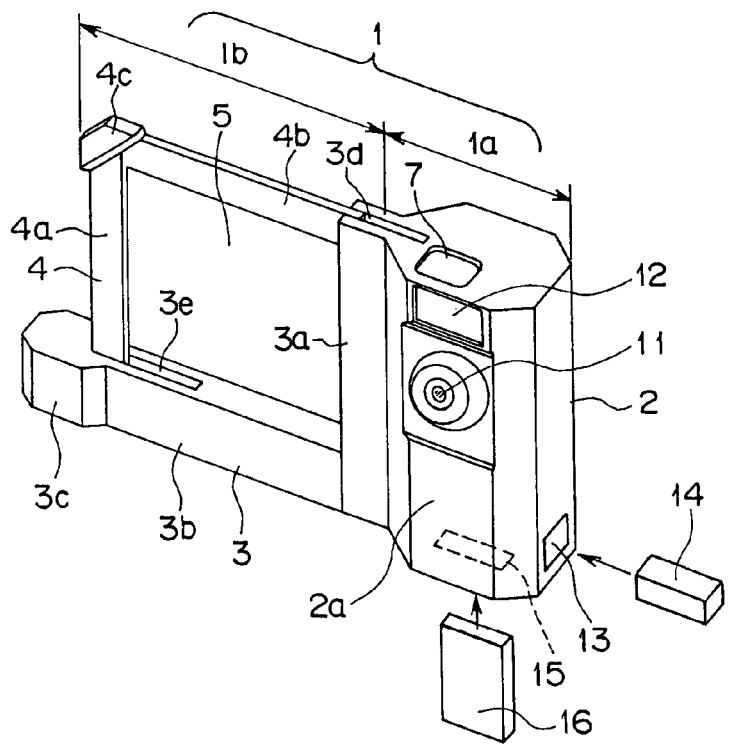
FIG. 1B is a perspective diagram illustrating the configuration of a camera from the front face side according to the first embodiment.

FIG. 1A through FIG. 11B show a first embodiment of the present embodiment, wherein FIG. 1A is a perspective diagram illustrating the configuration of a camera from the back side, and FIG. 1B is a perspective diagram illustrating the configuration of a camera from the front face side.

This camera 1 is configured as a digital camera, and a frame-shaped frame is used as framing means.

This camera 1 is divided primarily into a main unit 1a that has a function for picking up an image of a subject, and a frame unit 1b as the framing means to set the photographing range (composition) of the subject.

The above-mentioned main unit 1a comprises a camera main unit 2 wherein one portion also includes a gripping unit 2a, a photographing optical system 11 positioned on the front face side of this camera main unit 2 and configured as a zoom optical system for forming images of the subject image, a flash unit 12 positioned on for example the upper side of this photographing optical system 11 for casting light to the subject, a shutter button 7 that is the picture-taking instruction input means, positioned so as to form recessed face on the upper side of the above-mentioned camera main unit 2, a display unit 8 positioned on the back face side of this camera main unit 2, a media slot 13 positioned on the lower side of the side face of this camera main unit 2, and a battery attachment 15 positioned on the bottom side of this camera main unit 2, as shown in FIG. 1A through FIG. 1B.

The display unit 8 is used to display the various information relating to this camera 1, while also being used to confirm the image after picture-taking. Now, here a liquid crystal display device which is in color and which provides a certain degree of fineness, whereby confirmation can be made of the image, is assumed as the display unit 8, but in the case of configuring a camera at low cost, a black-and-white type of display device that only is capable of displaying the various information can be used, and further, an arrangement may be made wherein no such display device is provided at all.

The photographing optical system 11 is configured as a zoom optical system. This optical system 11 is capable of changing the focal length, as described above, and further, is configured so as to be able to change the photographing direction when as a whole image-pickup system, combined with the CCD 25 (see FIG. 5, FIG. 9 through FIG. 11B) to be described later.

The above-mentioned shutter button 7 is configured with for example a touch sensor and so forth, and unlike a normal camera, is configured so as to be able to input picture-making operation instructions simply by lightly touching instead of pushing the button. Therefore, in order to prevent erroneous operation, it is positioned within a recessed face as described above.

The above-mentioned media slot 13 is for attaching a memory medium 14 such as for example a memory card, in a detachable manner.

Further, the above-mentioned battery attachment unit 15 is configured for the battery 16 to be attached in a detachable manner. Now, a system that uses a fuel battery can be utilized instead of a system that uses a storage battery, and instead of the above-mentioned battery 16, a fuel cartridge can be attached in a detachable manner.

The above-mentioned frame unit 1b comprises a first L-shaped frame 3 disposed as one unit being integrated with from the side portion of the main unit 1a as described above, and a second L-shaped frame 4 provided so as to be capable of moving relative to this L-shaped frame 3, and a viewfinder 5 is a two-dimensional region formed by combining the L-shaped frame 3 and the L-shaped frame 4. The L-shaped frame 3 and the L-shaped frame 4 are capable of moving relative to each other, as will be described below, but this viewfinder 5 does not specify the largest opening that the L-shaped frame 3 and the L-shaped frame 4 could form, but rather specifies the size of frame opening that the combination of the L-shaped frame 3 and the L-shaped frame 4 currently form.

The above-mentioned L-shaped frame 3 comprises a vertical frame 3a that forms the left side of the above-mentioned viewfinder 5 when viewed from the back, and a horizontal frame 3b that forms the bottom side of this viewfinder 5, and on the end portion of this horizontal frame 3b is formed a holding unit 3c for holding this frame 1b with the hand.

The above-mentioned L-shaped frame 4 comprises a vertical frame 4a that forms the right side of the above-mentioned viewfinder 5 when viewed from the back, and a horizontal frame 4b that forms the upper side of this viewfinder 5, and on the upper right corner wherein the above-mentioned vertical frame 4a and horizontal frame 4b are linked is formed a gripping unit 4c for holding with the hand in the event of moving this L-shaped frame 4. On the vertical frame 3a of the above-mentioned first L-shaped frame 3 is formed a connection groove 3d, and on the horizontal frame 3b is formed a connection groove 3e, and into this connection groove 3d the above-mentioned horizontal frame 4b is inserted so as to be capable of sliding, and into this connection groove 3e the above-mentioned vertical frame 4a is inserted so as to be capable of sliding. By doing so, when the L-shaped frame 4 is moved by holding the above-mentioned gripping unit 4c with the fingers and so forth, the size or aspect ratio of the above-mentioned viewfinder 5 can be changed as desired within a predetermined range in the condition wherein the vertical frame 3a and vertical frame 4a remain parallel to each other, and the horizontal frame 3b and the horizontal frame 4b remain parallel to each other.

Further, on the face of the back face side of the camera of the above-mentioned horizontal frame 4b, the vertical frame 3a, and the horizontal frame 3b, a back-face image-pickup device 6a, 6b, and 6c are positioned respectively. These back-face image-pickup devices 6a, 6b, and 6c are configured using an image-pickup device that is relatively inexpensive and has a small power consumption such as for example a CMOS sensor, and are provided to confirm the eye position of the face of the photographer. Therefore, these back-face image-pickup devices 6a, 6b, and 6c do not need to be color image-pickup devices, but can be black-and-white type of image-pickup devices. Now, in order to detect the distance to the eye and the direction thereof, a minimum of two image-pickup devices will suffice, but here, in order to raise the level of measurement accuracy, and in order to remain capable of measurement in the event that one of the image-pickup devices is shielded by a hand or another obstruction, three image-pickup devices are provided. However, to keep the cost lower, an arrangement may be made wherein only two image-pickup devices are provided. Conversely, in order to maintain high measurement accuracy even in the event that one of the image-pickup devices is shielded by a hand or another obstruction, four or more back-face image-pickup devices may be provided. Further, positioning each back-face image-pickup device apart from one another within a feasible range is desirable to increase measurement accuracy (particularly the measurement accuracy relating to distance).

Further, on the face of for example the above-mentioned vertical frame 3a at the camera back side, a back illumination unit 9 is provided which is back illumination means for casting infrared light toward the back at this camera back side. This back illumination unit 9 is provided to illuminate the direction of the face of the photographer in a dark place and so forth, and so the light will not be a distraction to the photographer taking the photograph, infrared light is used in place of visible light. In the case of utilizing a back illumination unit 9 with infrared light, the above-mentioned back-face image-pickup devices 6a, 6b, and 6c would also need to use the type of image-pickup devices that can pick up images with infrared light, as a matter of course.

Figure 2:
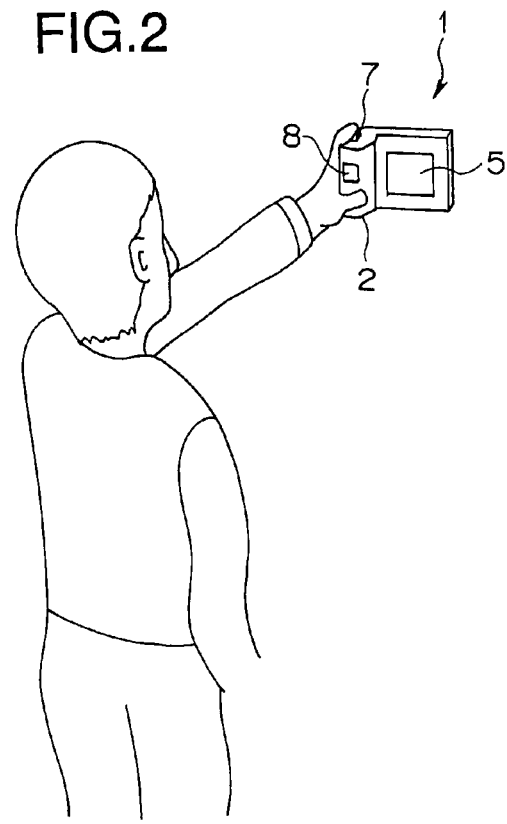
FIG. 2 is a perspective diagram according to the first embodiment, illustrating from the back side of the camera the situation wherein a photographer is holding a camera for picture-taking.
Figure 3:
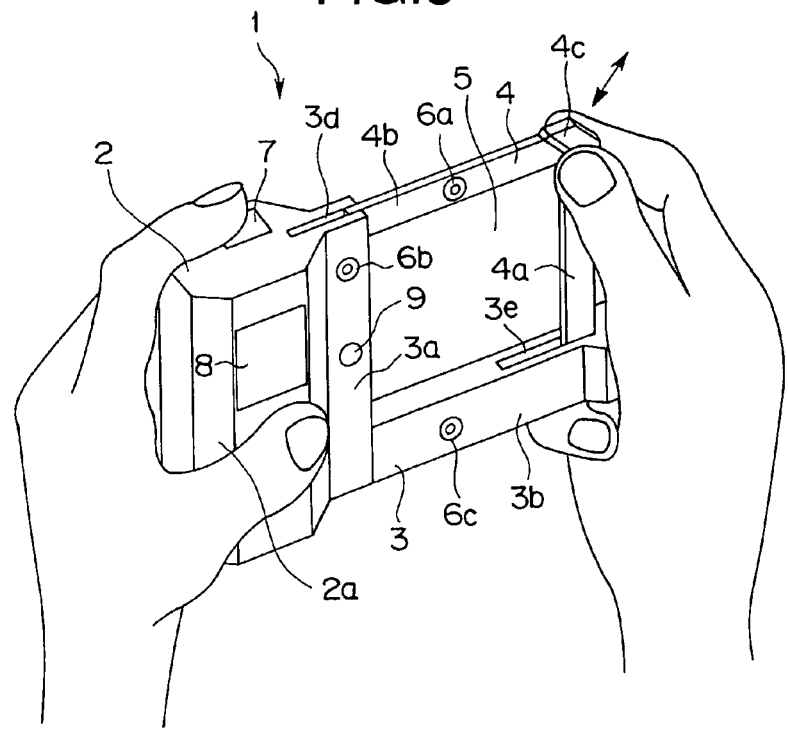
FIG. 3 is a perspective diagram according to the first embodiment, illustrating from the back side of the camera the situation of holding a camera and changing the size of the viewfinder.

Next, the usage of this type of camera 1 will be described with reference to FIG. 2 and FIG. 3. FIG. 2 is a perspective diagram illustrating from the back side of the camera the situation wherein a photographer is holding a camera for picture-taking, and FIG. 3 is a perspective diagram illustrating from the back side of the camera the situation of holding a camera and changing the size of the viewfinder.

As illustrated in FIG. 2, when performing picture-taking, the grip unit 2a of the camera 1 is held with the left hand, and with the left arm stretched out a certain amount, the composition is determined by moving the arm and so forth while observing the subject via the above-mentioned viewfinder 5 until the desired composition is completely inside this viewfinder 5, and picture-taking can be performed by touching the above-mentioned shutter button 7 with for example the forefinger of the left hand.

When making this type of composition decision, in the case that zooming is desired or changing the aspect ratio of the image is desired, the above-mentioned gripping unit 4c is gripped with for example the forefinger and thumb of the right hand, and size of the above-mentioned viewfinder 5 can be changed. In other words, if the size of the viewfinder 5 is reduced without the aspect ratio changing, this equates zooming, and if the ratio of the length of the vertical direction and the length of the horizontal direction of the viewfinder 5 is changed, the aspect ratio is changed.

Further, the configuration is such that zooming can also be performed by bringing back the left arm that is holding the camera 1 and changing the distance between the camera 1 and the eye of the photographer. As will be described in greater detail below, this is performed by the image of the face side of the photographer being captured by the above-mentioned back-face image-pickup devices 6a, 6b, and 6c, the distance and angles of the camera 1 and the eye of the photographer being calculated based on the image-picked-up data, and changing the center axis of the photographing luminous flux or zooming based on this calculated data.

Figure 4A:
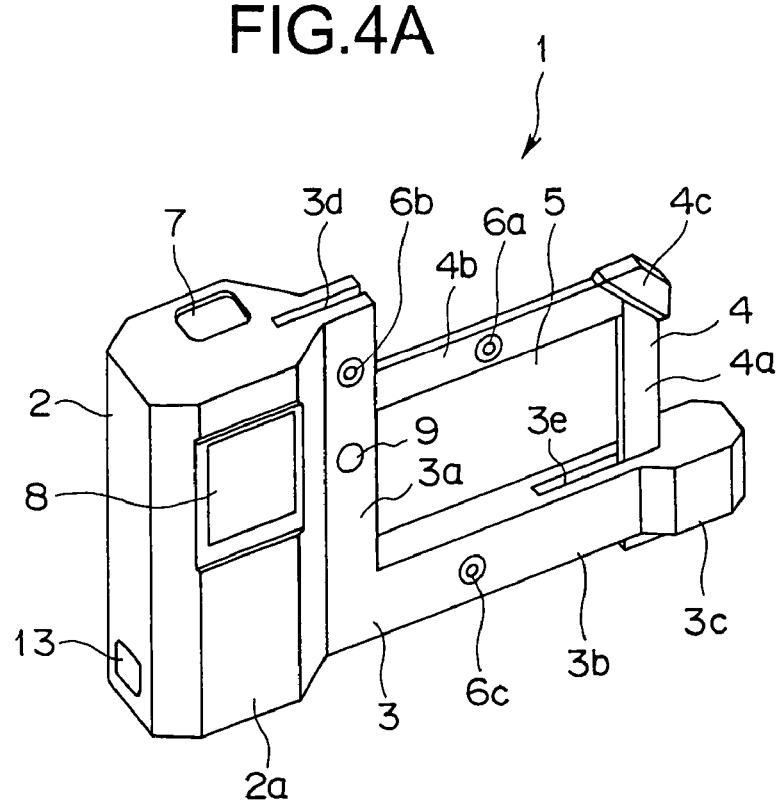
FIG. 4A and FIG. 4B are perspective diagrams according to the first embodiment, illustrating from the back side of the camera the situation wherein the viewfinder is changed when the gripping unit is operated.
Figure 4B:
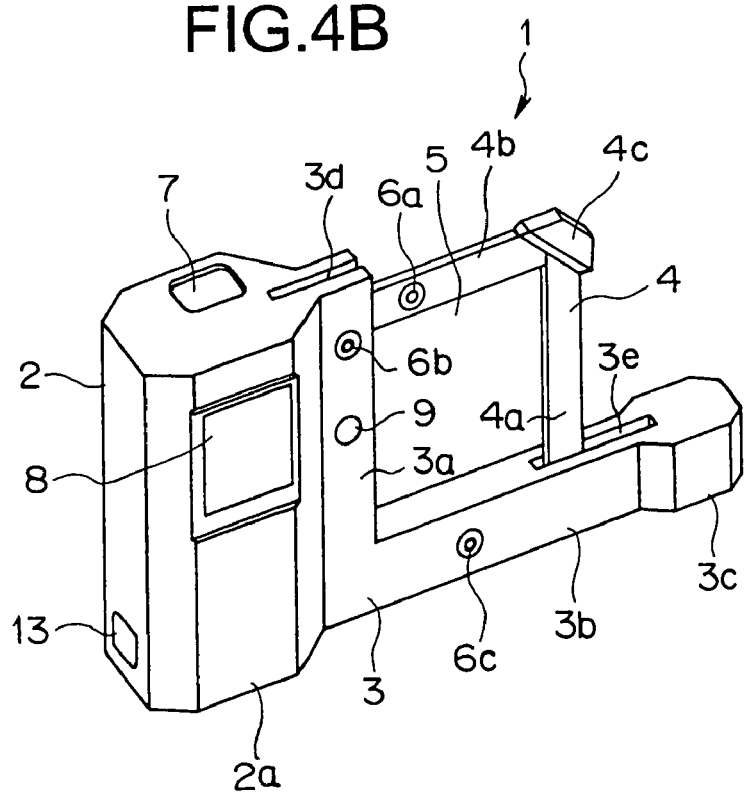

FIG. 4A and FIG. 4B are perspective diagrams illustrating from the back side of the camera the situation wherein the viewfinder 5 is changed when the gripping unit 4c is operated.

FIG. 4A illustrates the state of the viewfinder 5 wherein the picture is to be taken with an aspect ratio with a long horizontal side, which equates to a so-called panorama image.

Figure 5:
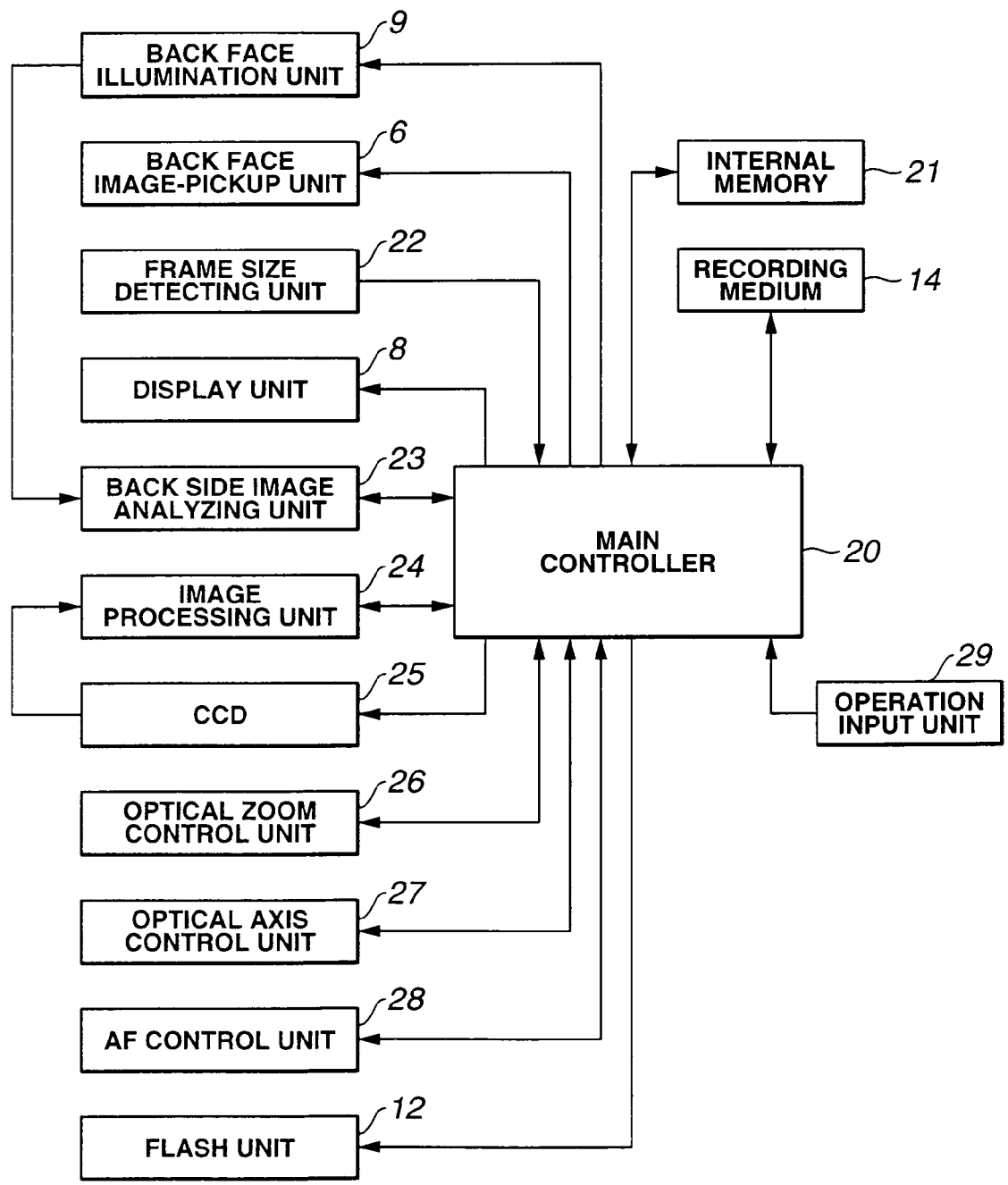
FIG. 5 is a block diagram illustrating the principal parts primarily of the electric configuration of a camera according to the first embodiment.

Further, FIG. 4B illustrates the state of the viewfinder 5 wherein the aspect ratio is adjusted so that the image will be somewhat longer vertically, and in the Continuing, FIG. 5 is a block diagram illustration the principal parts of the primarily electric configuration of a camera 1.

This camera 1 comprises a back illumination unit 9; a back-face image-pickup unit 6 which is eye position detecting means that is configured by including the above-mentioned back-face image-pickup devices 6a, 6b, and 6c; a frame size detecting unit 22, which is frame geometric property detecting means for detecting the length in the vertical direction and the length in the horizontal direction of the above-mentioned viewfinder 5 each as geometric properties; the above-mentioned display unit 8; a back side image analyzing unit 23, which is back side image analyzing means for calculating the distance and direction from the predetermined reference position of this camera 1 to the eye of the photographer, by analyzing the image at the camera back side that is captured by the above-mentioned back-face image-pickup unit 6; a CCD 25, which is an image-pickup device and photographing means, for converting the optical subject images formed by the above-mentioned photographing optical system 11 into an electronic image signal; an image processing unit 24, which is image processing means, for changing the center position of the cropped image in the event of electronic zoom based on the angle information to the eye of the photographer that is calculated in this back image analyzing unit 23, while performing electronic zooming based on the distance information to the eye of the photographer that is calculated by the above-mentioned back image analyzing unit 23 and the size information of the viewfinder 5 that is detected by the above-mentioned frame size detecting unit 22; an optical zoom control unit 26 that performs zoom control of the photographing optical system 11, based on the distance information to the eye of the photographer that is calculated by the above-mentioned back image analyzing unit 23 and the size information of the viewfinder 5 that is detected by the above-mentioned frame size detecting unit 22; an optical axis control unit 27 that changes the center axis of the photographing luminous flux based on the angle information to the eye of the photographer that is calculated by the above-mentioned back image analyzing unit 23; an AF control unit 28 that performs focus control on the above-mentioned photographing optical system 11 and controls so that the focused subject image is formed on the above-mentioned CCD 25, based on the distance measurement results and so forth by the AF sensor not shown or the distance measurement results and so forth by the hill-climbing AF and so forth using the photographed image by the above-mentioned CCD 25; a flash unit 12 for casting the aid light for picture-taking in the case that the brightness of the subject is low; an operation input unit 29 that includes the above-mentioned shutter button 7, a power switch, a mode setting switch, and so forth; internal memory 21 for storing various data or processing programs that are executed by a later-described main controller 20, and further includes a region for storing only the number of predetermined frames of captured image data (frame buffer); a memory medium 14 that is configured so as to be detachable as described above, for example, and records the image data that is captured by the above-mentioned CCD 25 and given picture-taking instructions by the above-mentioned shutter button 7 within the image data stored in the above-mentioned frame buffer in, for example, a file format; and a main controller 20, which is photographing range adjusting means and control processing means, that controls this camera 1 in an integrating manner that includes the above described various circuit units and so forth, and performs various calculation processing and so forth.

Figure 6:
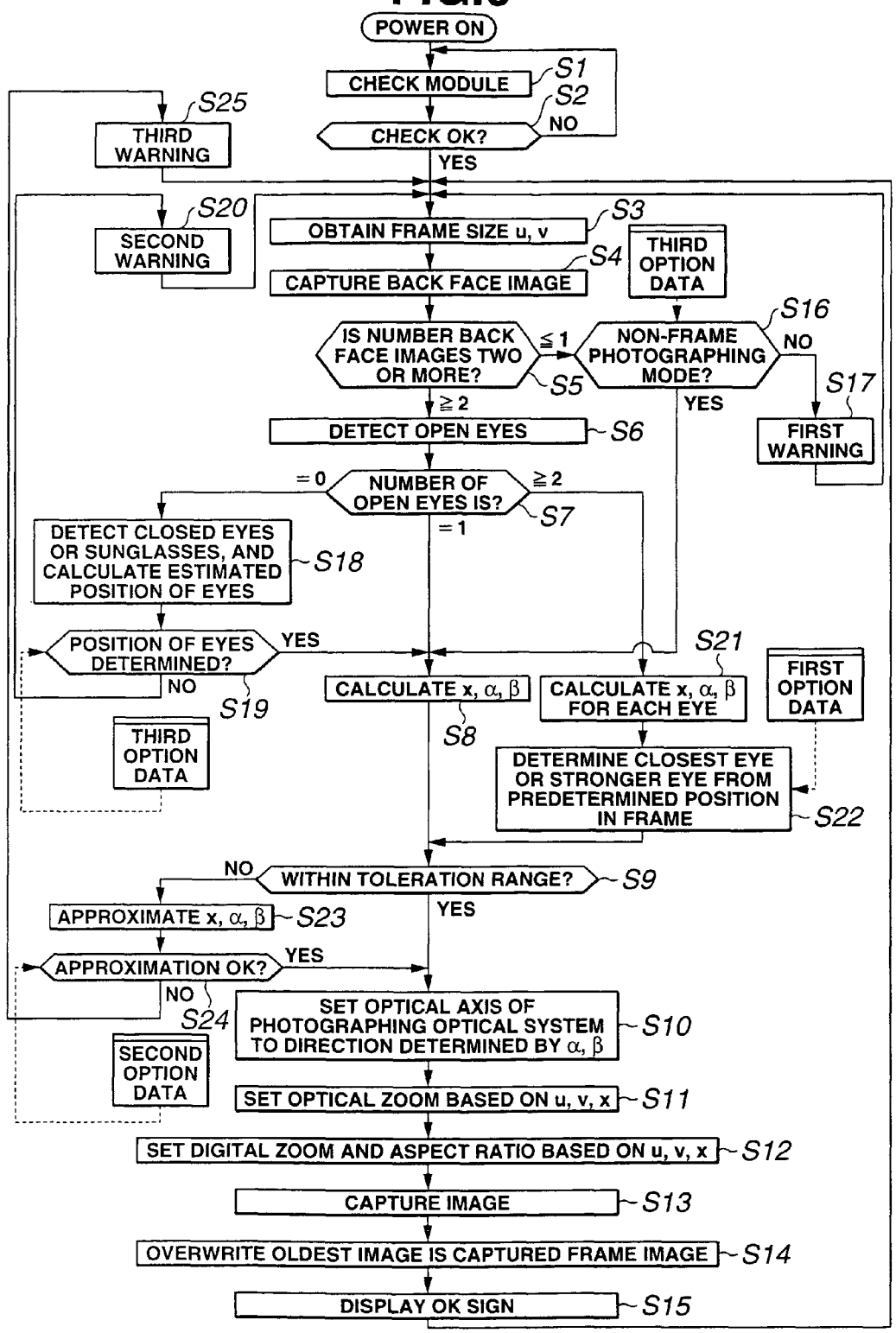

Continuing, FIG. 6 is a flowchart illustrating a summary of the operation of the camera when the power is turned on.

The power of this camera 1 is turned on by operating the power switch of the above-mentioned operation input unit 29, and first, checking and initialization of the various module of this camera 1 are performed (step S1). Then whether or not the check results are OK is determined (step S2), and the flow returns to the above-mentioned step S1 and checks until the result is OK.

In this manner, at the point that the check results are OK, the size u of the vertical direction of the viewfinder 5 and the size v of the horizontal direction (reference FIG. 7) are captured by the above-mentioned frame size-detecting unit 22 (step S3).

Next, the image at the back side of the camera 1 is captured by the above-mentioned back-face image-pickup unit 6 (step S4). When this image is being captured, in the case that the brightness is low at the face and so forth of the photographer positioned on the back side of the camera 1, illumination is performed by casting infrared light by the above-mentioned back illumination unit 9.

Subsequently, determination is made as to whether the number of the captured back images is two or greater (step S5). As described above, in order to detect the distance to the eye of the photographer and the angle thereof, at least two back images become necessary, and therefore determination is made here as to whether the back image has been correctly captured from at least two of the image-pickup devices among the above-mentioned back-face image-pickup devices 6a, 6b, and 6c.

Within this step S5, in the case that the determination is made that two or more back images are captured, the captured back images are each analyzed by the above-mentioned back image analyzing unit 23, and the open eyes are detected (step S6).

Next, based on the number of open eyes, the process branches (step S7).

Here, in the case that the number of open eyes is 1, the distance x from the predetermined reference position of the camera 1 to the detected open eye, and the angles $\alpha$ and $\beta$ of the lines directed from the predetermined reference position to the eye are calculated (step S8). Here, FIG. 7 is a perspective diagram, describing the three-dimensional eye position of the photographer in relation to the camera 1.

Figure 7:
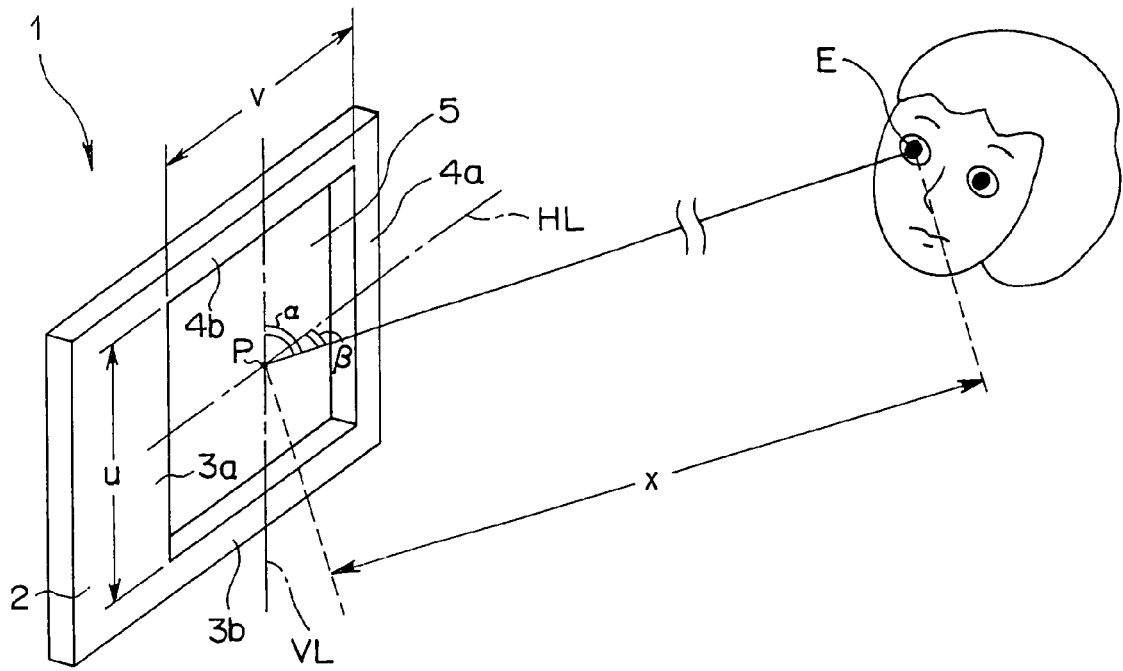
FIG. 7 is a perspective diagram according to the first embodiment, describing the three-dimensional eye position of the photographer in relation to the camera.

In the example illustrated in FIG. 7, the center position P of the above-mentioned viewfinder 5 is set as the predetermined reference position of the camera 1 that is to be the basis for detecting the position of the eye E of the photographer. This center position P is a position wherein the two diagonal lines of the viewfinder 5 that form a rectangle intersect. Now, the above-mentioned predetermined reference position does not need to be limited to this center position P, and can be set appropriately, but here for the ease of calculations of the above-mentioned x, α, and β, and so forth, the above-mentioned center position P is set.

Further, the above-mentioned distance x is defined as the distance between this center position P and the eye E of the photographer.

Further, a vertical line VL that passes through the above-mentioned center position P and is parallel in the vertical direction of the viewfinder 5, and a horizontal line HL that passes through the above-mentioned center position P and is parallel in the horizontal direction of the viewfinder 5 are considered.

At this time, the above-mentioned angle α is defined as an angle formed by the line segment that ties the above-mentioned center position P and the eye E of the photographer, and the above-mentioned vertical line VL, the above-mentioned angle β is defined as an angle formed by the line segment that ties the above-mentioned center position P and the eye E of the photographer, and the above-mentioned horizontal line HL.

Now, these definitions were made in this manner here, but other various coordinate systems may be made for performing definitions, because the main point is that the three-dimensional positional relationship between the predetermined reference position of the camera 1 and the eye E of the photographer can be accurately measured. When doing so, selecting a coordinate system wherein the calculation circuit process can be performed at high speed and low demand power is desirable.

Figure 8:
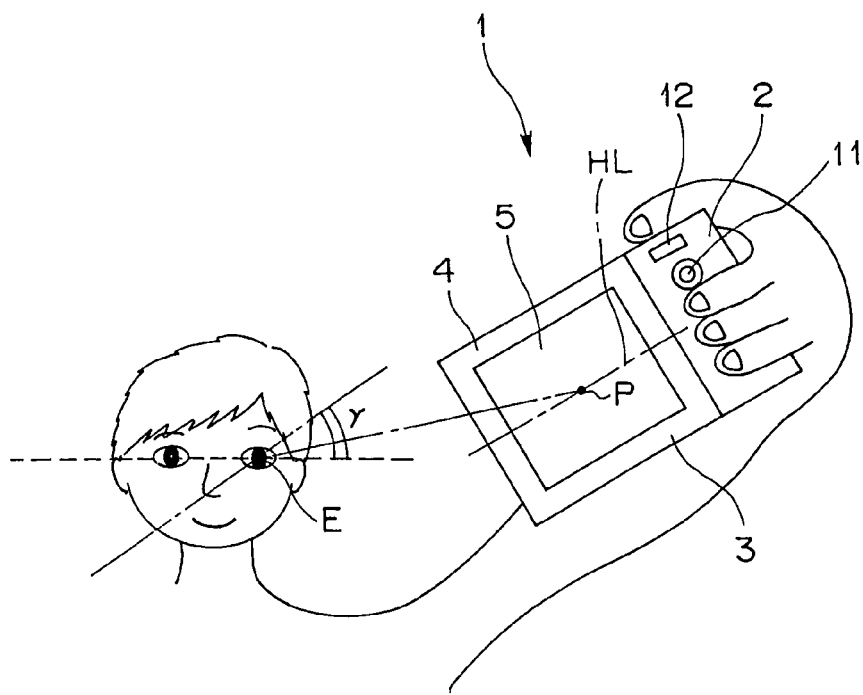
FIG. 8 is a diagram according to the first embodiment, describing the angle γ made by the horizontal direction of the photographer and the horizontal direction of the camera.

Further, by obtaining x, α, and β, here, the position of the eye E of the photographer relative to the camera 1 is to be found, but further in addition, an angle γ as illustrated in FIG. 8 may be calculated and used. FIG. 8 is a diagram describing the angle γ made by the horizontal direction of the photographer and the horizontal direction of the camera.

Even if the eye E of the photographer is on the straight line that passes through the center position P and is perpendicular to the plane that forms the above-mentioned viewfinder 5 (in other words, a straight line that passes through the center position P and is perpendicular to the above-mentioned vertical line VL and is perpendicular to the above-mentioned horizontal line HL), within the range of fulfilling the geometric conditions, the horizontal direction of the camera 1 may differ from the horizontal direction of the photographer. The angle that is formed in this case is the angle γ.

This angle γ can be defined as, for example, the angle that is formed by the line that is obtained by connecting both eyes of the photographer and projected onto the plane that forms the viewfinder 5, and the above-mentioned horizontal line HL (FIG. 8 illustrates the angle γ as the angle that is formed by the line that is obtained by connecting both eyes of the photographer and the line that is formed by projecting this horizontal line HL onto the plane that forms the body front of the photographer, and this is the equivalent of the above).

By using the data of this type of angle γ, for example, corrections can be made in the case that the photographer has unintentionally performed the photographing while tilting the camera 1 and rotating it along the straight line PE as described above.

Returning to the description of FIG. 6, determination is made as to whether or not the size u of the vertical direction and size v of the horizontal direction of the viewfinder 5 captured as described above, and x, α, and β calculated as described above are within the allowable range (step S9). In other words, determination is made here as to whether or not the subject range that the photographer is observing via the viewfinder 5 can be included within the zoom range that is formed by combining the optical zoom and the electronic zoom, based on the above-mentioned u, v, and x, and further, determination is made as to whether or not the center of the subject range that forms the photographing object that is moved by changes to the center axis of the photographing luminous flux formed by the shift of the CCD 25 against the photographing optical system 11 as described below, based on the above-mentioned α, and β or changes to the center axis of the photographing luminous flux formed by the rotation of the photographing optical system 11 and the CCD 25 as one unit as described below, or a shift of the electronic photographing range by cropping the image that is formed by a combination of these or one by itself, can be matched to the portion of the subject that is on the straight line from the eye E of the photographer towards the center position P of the viewfinder 5.

Here, in the case that it is determined to be within the allowable range, the optical axis of the photographing optical system 11 is set based on the direction determined by the above-mentioned angles α and β (step S10). At this time, in the case wherein adjustment of the photographing direction can be made with optical means alone as described above, the center axis of the photographing luminous flux is set to match to the direction determined by these angles α, and β, and further, in the case wherein adjustment of the photographing direction is not possible with the optical means alone, settings are made to be nearer to the direction determined by the angles α, and β as much as possible. Now, in this case, shifting is performed of the electronic image center by changing the center position of the cropping range of the image at a later time.

Next, the optical zoom is set based on the above-mentioned u, v, x (step S11). Here also, in the case that this can be handled with the optical zoom alone, the optical zoom is changed to the magnification determined by the above-mentioned u, v, and x, but in the case that it is not possible with the optical zoom alone, settings are made to near the magnification determined by the above-mentioned u, v, and x, as much as possible. In this case also, the magnification is set as determined by this u, v, and x, by combining with the electronic zoom at a later time.

Then, based on the above-mentioned u, v, and x, the electronic zoom and aspect ratio is set (step S12). At this time, if necessary, the cropping range is also changed based on the above-mentioned angles α and β.

Next, the image is captured by the above-mentioned CCD 25, and image processing is performed by the above-mentioned image processing unit 24 (step S13).

The frame image newly captured in this manner is overwritten on the oldest frame image within the frame images stored in the frame buffer of the internal memory 21 (step S14). Here, within the internal memory 21, as described above, a memory region serving as a frame buffer is secured wherein the image data for only a predetermined number of frames can be stored, which are stored in units of frames in the order of FIFO (First In, First Out). Therefore, after the predetermined number of frames worth of image data is stored, the oldest image data is overwritten in order by the newest image data.

After this, an OK sign is displayed indicating that the picture-taking has been performed with no impediment (step S15), using the above-mentioned display unit 8 and so forth. Now, the OK sign is not limited to a display only, but can be performed for example by audio, or by a combination of display and audio.

After performing this step S15, the flow returns to the above-mentioned step S3, and repeats the above described operation. In other words, while the power of this camera 1 is turned on, the above described series of photographing operations are constantly repeated, and when the above-mentioned shutter button 7 is touched during the performance of these operations, the image that is photographed at that time is recorded for example in a file format as the photographed image to the above-mentioned recording medium 14. In this manner, since the newest image of the constantly captured images is saved as the photographed image, the camera has excellent operability with very little photographing time lag. Further, in order to decrease the time lag even further, the shutter button 7 is a type as described above that is operated simply by being lightly touched instead of being pressed down. By doing so, the camera has excellent operability wherein the awkwardness felt by the photographer at the time of picture-taking is further reduced.

Further, in the above-mentioned step S5, in the case that the number of captured images is one or less, determination is made as to whether or not the non-frame photographing mode is set, which can be set as an option with this camera 1 (step S16). This non-frame photographing mode does not set the range observed via the above-mentioned viewfinder 5 as the photographing range, but rather is a mode wherein picture-taking is performed as set according to the predetermined zoom position and the predetermined photographing direction. This type of non-frame photographing mode is a photographing mode provided for use, for example, in the case wherein a photojournalist desires to take the image of a subject while holding his/her hand high over his/her head, or in the case of facing the photographing optical system 11 of the camera 1 towards oneself and holding ones hand out and photographing oneself.

Here, in the case that the non-frame photographing mode is set, the data set as the third option data is read, and the flow continues to the processing of the above-mentioned step S8. Here, as the third option data, each predetermined value of $\alpha=\alpha 0$, $\beta=\beta 0$, and $x=x0$ is prepared, and as specific examples of these predetermined values, $\alpha 0=\beta 0=90°$, $X0=(u+v) \times k$ (wherein k is a predetermined constant) can be given. Now, as X0, the statistics of the distance x to the eye of the photographer using this camera 1 can be acquired, and the average value thereof may be used. Further, based on the statistics, the correlation between (u+v) and x can be determined, and the above-mentioned constant k can be decided as applicable.

Further, in the case that the non-frame photographing mode is not set in the above-mentioned step S16, the number of back images in order for photographing with the frame photographing mode is insufficient, and because the distance or angle to the eye of the photographer cannot be correctly measured, a warning is performed as the first warning (step S17), and the flow returns to the above-mentioned step S3.

On the other hand, in the case that the number of open eyes in the above-mentioned step S7 is 0, detection of closed eyes or sunglasses is performed, and based on the detection results the estimated eye position is calculated (step S18).

Based on the processing of this step S18, determination is made whether or not a reasonable estimated eye position is decided (step S19). In the case that the eye position is determined, or if setting is such that the third option data as described above is used as the estimated value, the flow continues to the processing of the above-mentioned step S8.

Further, in the case that the calculated estimated eye position is not reasonable, or in the case that the estimated position itself of the eye is not calculated, a warning is performed as the second warning (step S20), and the flow returns to the above-mentioned step S3.

On the other hand, in the case that the number of open eyes in the above-mentioned step S7 is two or more, first the above-mentioned x, $\alpha$, and $\beta$ are calculated for each of the open eyes (step S21), and based on the calculation results, the eye closest to the above-mentioned center position P is selected (step S22). Now, here the closest eye to the center position P is selected, but instead of doing so, the so-called stronger eye can be estimated based on the back images, and the estimated stronger eye can be selected. Alternatively, the stronger eye can be selected using the first option data. Here, the first option data is the stronger eye data set by the user, and can be selected from the setting items of left eye, right eye, or no setting. After performing this process, the flow continues to the above-mentioned step S9, and performs processing of this step S9 using the data x, $\alpha$, and $\beta$, that were calculated in the above step S21 relating to the selected eye.

Further, in the above-mentioned step S9, in the case that determination is made that the calculated x, $\alpha$, and $\beta$ are not within the allowable range, an approximation of x, $\alpha$, and $\beta$ is performed so as to be within the allowable range (step S23).

Determination of whether or not these approximated x, $\alpha$, and $\beta$ are valid is made referencing the second option data (step S24), and in the case they are determined to be valid, the flow continues to the processing in the above-mentioned step S10. Here in the second option data are stored the classification of the approximation levels, and the breakdown thereof is (1) the case wherein x, $\alpha$, and $\beta$ are not capable of being approximated, (2) the case wherein approximation relating to x can deal with the situation, (3) the case wherein approximation relating to $\alpha$, and $\beta$ alone can deal with the situation, and (4) the case wherein the situation can be dealt with if all of x, $\alpha$, and $\beta$ are approximated. Of these, (2) through (4) are determined to be reasonable, while (1) is determined not to be reasonable.

In the case that determination is made to be not reasonable within this step S24, a warning is performed as the third warning (step S25), and the flow returns to the above-mentioned step S3.

Next, while referencing FIG. 9, FIG. 10A, FIG. 10B, and FIG. 10C, one example of the configuration wherein change is made to the center axis of the photographing luminous flux will be described.

Figure 9:
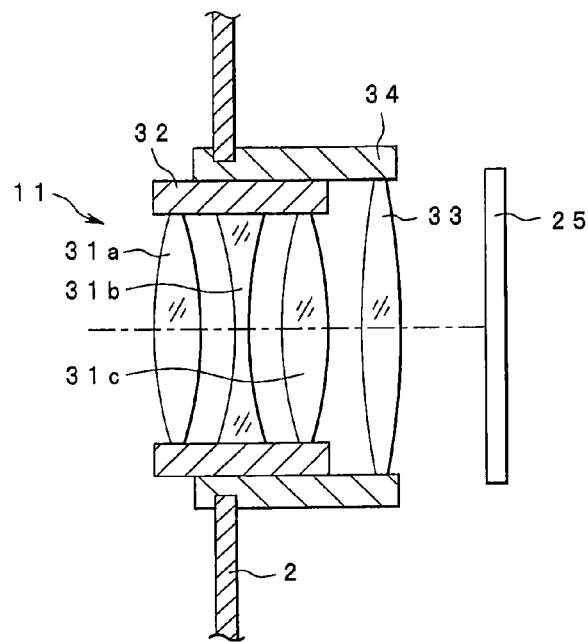
FIG. 9 is a cross-sectional diagram according to the first embodiment, illustrating one example of the configuration of the photographing optical system.

First, FIG. 9 is a cross-sectional diagram illustrating one example of the configuration of the photographing optical system.

The photographing optical system 11 for example comprises lenses 31a, 31b, and 31c that are positioned on a zoom lens frame 32, and a lens 33 that is positioned on the lens frame 34 that supports this zoom lens frame 32 at least so as to be capable of movement in the optical axis direction. Now, the above-mentioned lens frame 34 is fixed to the camera main unit 2 for example.

On the upper rear side of the optical axis of this photographing optical system 11, a CCD 25 is positioned so as to match the center position of that image pickup plane onto this optical axis. This type of positioning wherein the center position of the image pickup plane of the CCD 25 is matched to the optical axis of the photographing optical system 11 is the standard positioning for this camera 1.

In this type of configuration, change to the focal length of the photographing optical system 11, in other words zooming, is performed by moving the above-mentioned lenses 31a, 31b, 31c that make up a zoom lens group in the direction of the optical axis via the above-mentioned zoom lens frame 32.

Figure 10A:
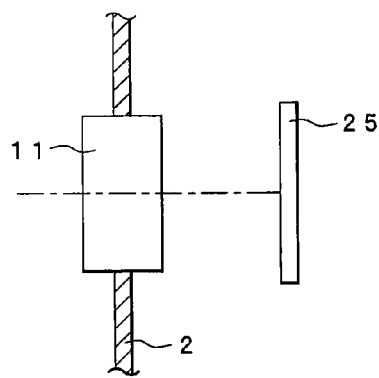
FIG. 10A, FIG. 10B, and FIG. 10C are side cross-sectional views and a front view diagram according to the first embodiment, illustrating a case of changing the center axis of the photographing luminous flux of the photographing optical system.
Figure 10C:
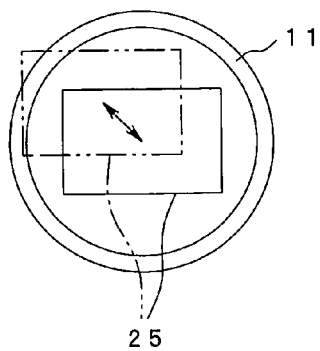
Figure 10B:
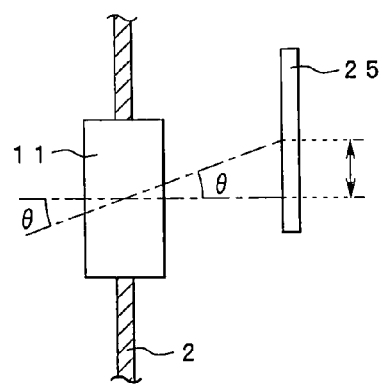

Next, FIG. 10A, FIG. 10B, and FIG. 10C are side cross-sectional diagrams and a front view diagram illustrating the situation of changing the center axis of the photographing luminous flux of the photographing optical system.

FIG. 10A is a diagram illustrating the standard positioning illustrated in the above-mentioned FIG. 9 in a simplified manner.

In contrast, FIG. 10B and FIG. 10C illustrate the situation wherein the CCD 25 is viewed from the front, shifted to the upper left by the shifting means, and is a positioning wherein the center axis of the photographing luminous flux forms the predetermined angle $\theta$ against the optical axis of the photographing optical system 11, and also the center position of the image pickup plane on the CCD 25 is shifted from the optical axis by the amount illustrated by the arrows in FIG. 10B or FIG. 10C. Now, the shifting means are not specifically illustrated, but a wide variety of means for shifting the position of the CCD 25 in the direction of intersecting with the optical axis can be applied, using a drive source such as a motor or a solenoid plunger.

The above-mentioned angle $\theta$ is set according to the detected angles $\alpha$ and $\beta$, as described above. By doing so, even if the photographer is observing the viewfinder 5 from a diagonal direction, the field of view range that the photographer is observing via this viewfinder 5 at this time can be set approximately accurately as the region of the photographing object, and picture-taking can be performed.

Figure 11A:
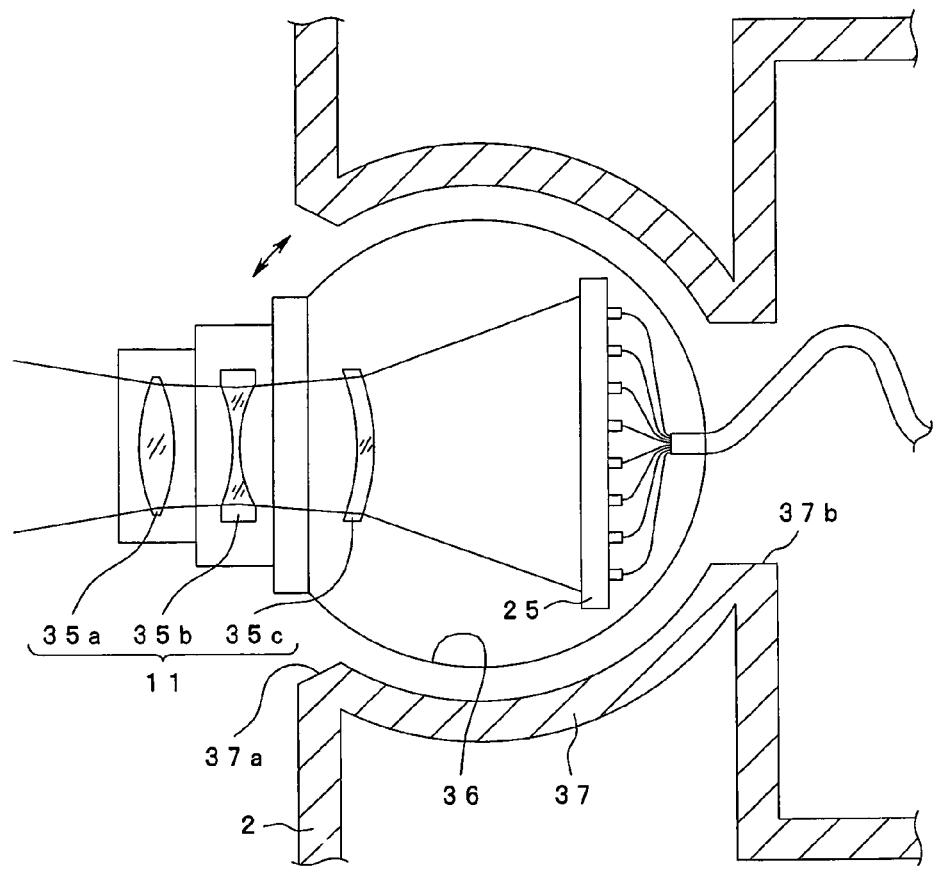
FIG. 11A and FIG. 11B are a side cross-sectional diagram and a front view diagram according to the first embodiment, illustrating the another example of changing the center axis of the photographing luminous flux.
Figure 11B:
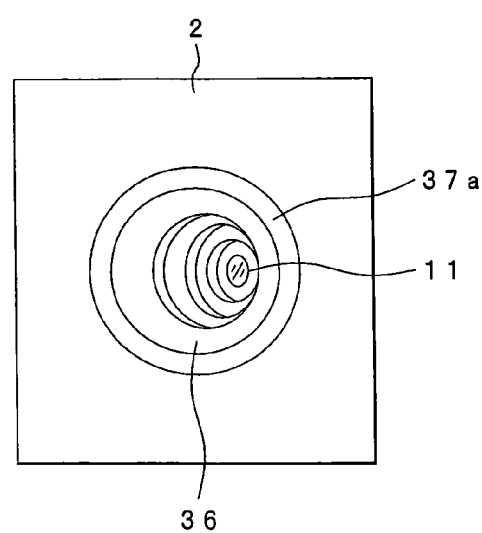

Continuing, FIG. 11A and FIG. 11B are a side cross-sectional diagram and a front view diagram illustrating another example of changing the center axis of the photographing luminous flux.

The above-mentioned photographing optical system 11 is configured including for example lenses 35a, 35b, and 35c, as illustrated in FIG. 11A. Each of these lenses 35a, 35b, and 35c are supported by the lens frame 36 that forms an approximately spherical shape, so as to be capable of moving in the optical axis direction when performing focus operations or zooming operations.

On the image forming position from the above-mentioned lenses 35a, 35b, and 35c within this lens frame 36 is positioned a CCD 25, so as to output the image signal obtained from the photoelectric conversion to the above-mentioned image processing unit 24 that is provided on the inner portion of the camera main unit 2.

The above-mentioned lens frame 36 is held by the approximately spherical lens frame holding unit 37 of the camera main unit 2 so as to be capable of rotating, and the side that is holding the above-mentioned lenses 35a, 35b, and 35c is exposed from the opening unit 37a that is provided on the camera front face side of this lens frame holding unit 37 (also see FIG. 11B), and on the other hand, the cables and so forth extending from the above-mentioned CCD 25 are formed so as to be extracted from the opening unit 37b provided on the camera inner portion side of the lens frame holding unit 37.

The above-mentioned lens frame 36, more specifically, floats so as to not be in contact with the above-mentioned lens frame holding unit 37, by using magnetic power for example, and when rotational power is added, it rotates freely with the freedom level 2 around the center of the spherical form, within the predetermined allowable range. Now, addition of the rotational force can be performed by changing the magnetic strength that holds the floating state, or performed by another mechanical type of power.

Now, an outer zoom type of optical system is illustrated in the above described example, wherein the front edge side of the photographing optical system 11 is exposed to the outside of the lens frame 36, but in the event that an inner zoom type of optical system is used instead, a configuration can be realized without protruding, and the freedom level of rotation can be maintained more widely, and therefore from this viewpoint, and from the viewpoint of protecting the photographing optical system 11, this is more desirable. At the same time, relating to focus, either an outer focus or an inner focus can be used, but the inner focus is more desirable.

Now, the above-mentioned L-shaped frames 3 and 4 are assumed to be formed of a normal material that is not transparent, for example a plastic that is not transparent, but do not need to be limited to this, and a material with a partial transparency rate of, for example, several percent to several tens of percent (for example a smoked glass or a smoked form of plastic) may be used to form this. By configuring in this manner, the scenery on the subject side via the L-shaped frames 3 and 4 is somewhat dark but can be observed, and therefore determining the composition and so forth becomes easier.

Further, the configuration can be such that scales and so forth are provided on the back side of the above-mentioned first L-shaped frame 3 and the second L-shaped frame 4 (in other words, the side that is viewable by the photographer), and the measurements of the viewfinder 5 can be accurately grasped.

Further, holding the gripping unit 2a with the left hand and operating the gripping unit 4c with the right hand has been described above, but the configuration can be opposite left and right, wherein the gripping unit is provided so as to hold with the right hand, and the gripping unit can be provided to operate with the left hand. Alternatively, the operation thereof would become somewhat more difficult, but the camera could be held with one hand and adjustments of the viewfinder could be made with that same holding hand.

Also, according to the above description, the first L-shaped frame 3 itself and the second L-shaped frame 4 itself were both fixed members, but for example, a configuration can be made which enables being folded up during periods of non-use, by providing a hinge and so forth on the corner unit of these members that form the L-shape. At this time, an enclosing unit can be provided within the above-mentioned gripping unit 2a, and the folded L-shaped frames 3 and 4 can be enclosed in the inner portion.

In addition, according to the above description, the transparent plate member such as the glass plate or transparent plastic plate is not particularly imbedded into the portion of the viewfinder 5, but these can be formed by imbedding. At this time, adding a grid of index lines for example to the transparent plate member can be used for determining composition. Further, multiple transparent plate members possessing multiple index lines of different types can be prepared, such as a transparent plate member comprising a grid of index lines with rough spacing, a transparent plate member comprising a grid of index lines with fine spacing, a transparent plate member comprising index lines of the golden ratio, and so forth, and these can be made interchangeable. These index lines are drawn so as to divide the above-mentioned viewfinder 5 in the predetermined distribution, and one line can be used, or multiple lines can be combined. Further, not only can index lines be used, but also shapes, designs, or colors that can serve as an aid in determining the composition, or a combination thereof, can be used.

Further, according to the above description, the back side image is captured by using a CMOS type image-pickup device for example, and the eye position of the photographer is detected by analyzing the captured image, but the eye position detecting means does not need to be limited to this, and means to detect the eye position such as an infrared or laser light and so forth, can be used. In the case of using these other means, using detecting means that does not interfere with picture-taking is desirable.

According to this first embodiment, the image range viewed via the viewfinder can be taken as is, and therefore the picture-taking can be performed with a natural sensation without feeling any awkwardness.

Further, standard cameras can only take images with a limited aspect ratio in steps such as normal picture-taking or panorama picture-taking, but according to the camera of the present embodiment, the aspect ratio of the image can be set continuously as desired, within a predetermined range.

Further, the object of detection is not the movement of the eyeball of the photographer, but rather is the eye position of the photographer, and therefore highly accurate and expensive detecting devices and so forth are not necessary, and the camera can be configured at a relatively low cost.

Also, accurate detection can be performed even in a dark place wherein detecting the eye position of the photographer would be difficult with only the ambient light, since the back illumination unit is provided.

Second Embodiment

Figure 12A:
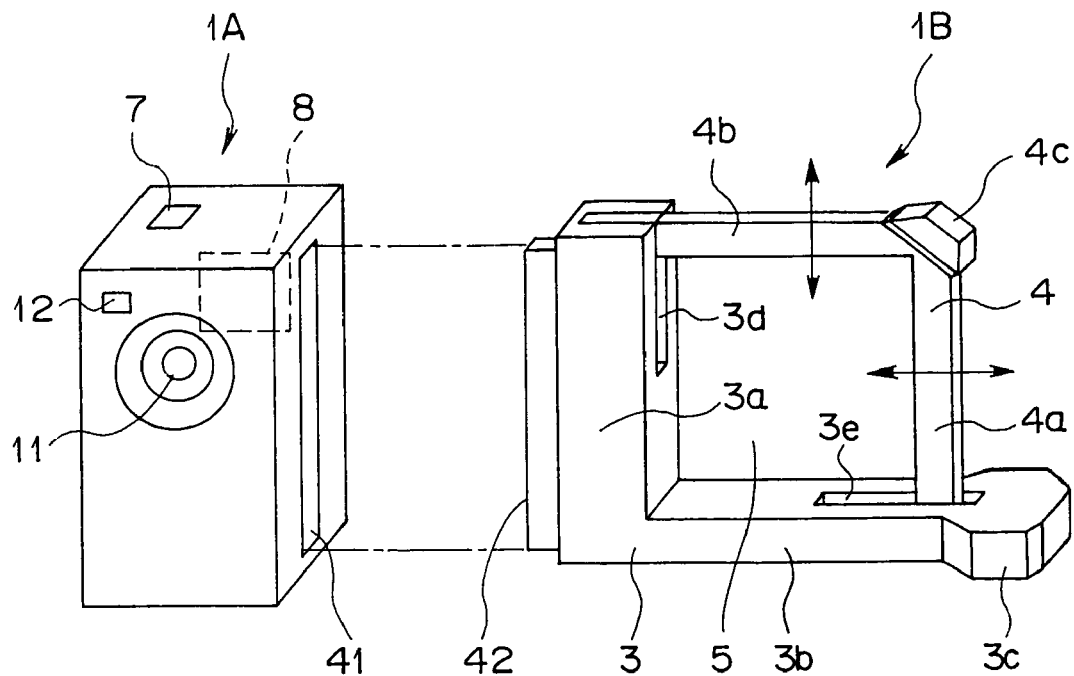
FIG. 12A and FIG. 12B are diagrams according to a second embodiment of the present invention, illustrating the configuration of a camera wherein the frame unit is attached to the main unit so as to be detachable.
Figure 12B:
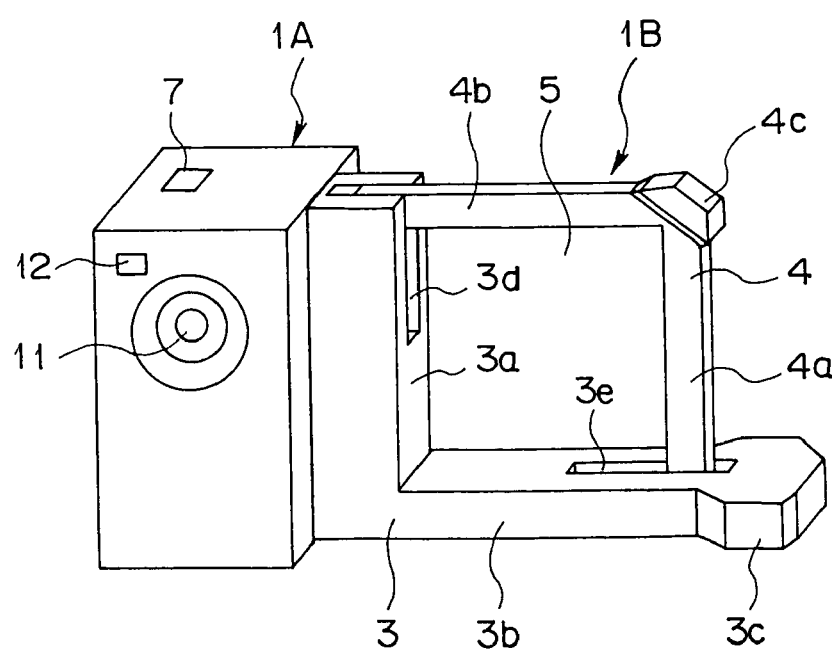

FIG. 12A and FIG. 12B illustrate a second embodiment according to the present invention, and are diagrams illustrating the configuration of a camera wherein the frame unit is attached to the main unit so as to be detachable.

With regard to this second embodiment, the portions the same as those in the above-described first embodiment will be denoted with the same reference numerals and description thereof will be omitted; primarily only the different portions will be described.

The camera according to this second embodiment is configured so that the frame unit 1B which is the first camera unit and framing means for setting the photographing range of the subject can be attached so as to be detachable from the main unit 1A of the second camera unit having the function for capturing the image of a subject.

In other words, a connector unit 41 is provided on the main unit 1A, and a connector unit 42 is provided on the frame unit 1B for this connector unit 41 to connect.

The above-mentioned main unit 1A can be used as a camera for capturing the image of a subject as an independent unit, and as illustrated in FIG. 12A, in the state wherein it is separated from the frame unit 1B, the photographing range is decided using the above-mentioned display unit 8, and picture-taking is performed.

On the other hand, as illustrated in FIG. 12B, in the state wherein the main unit 1A and the frame unit 1B are connected, similar to the above-described first embodiment, the composition can be determined by changing the size of the above-mentioned viewfinder 5 or moving the arm closer or further that is holding the camera, and thereby changing the accompanying zooming operation or center axis of the photographing luminous flux.

According to this second embodiment, in addition to realizing almost identical advantages of the above-described first embodiment, picture-taking with only the main unit is can be realized because the main unit and the frame unit can be separated, and therefore, according to the preference of the user, or in the case of multiple users taking turns using one camera, the desired photographing method can be selected according to the expertise and preferences of each user, and thus the camera has even better operability.

Third Embodiment

FIG. 13A and FIG. 13B illustrate a third embodiment according to the present invention, wherein FIG. 13A is a perspective diagram illustrating from the front face side the main unit of a camera type wherein the frame unit is separated from the main unit, and FIG. 13B is a perspective diagram illustrating from the back side the frame unit of a camera type wherein the frame unit is separated from the main unit.

With regard to this third embodiment, the portions which are the same as those in the above-described first and second embodiments will be denoted with the same reference numerals and description thereof will be omitted, and primarily only the different portions will be described.

This camera is configured such that the frame unit 1B is a separate unit from the main unit 1A, wherein a wireless transmitting unit 45 which is a communication means is provided on the main unit 1A, and a wireless transmitting unit 46 which is a communication means is provided on the frame unit 1B, and the units can transmit wirelessly with each other.

Further, the wireless transmitting units 45 and 46 are configured so as to be used as relative angle detecting means to detect the relative angles of the frame unit 1B to the main unit 1A. This relative angle detecting means is specifically a means that uses a transmitting method of magnetic induction, for example. This transmitting method is a transmitting method that generates a magnetostatic field, and at the same time applies a low frequency electromagnetic field onto this magnetostatic field, and uses the changes generated thereby, and the antenna used for transmissions is a magnetic dipole antenna (specifically, a bar coil). When the magnetic dipole of the sending side generates a magnetic field that changes at a low frequency, on the magnetic dipole antenna on the receiving side current is induced and generated by this changing magnetic field. The size of the induced current is dependent on the relative tilt of both dipole axes, due to the magnetic characteristics of the magnetic dipole, wherein the size is greatest in the case that both dipole axes are parallel to one another, and is smallest in the case that both dipole axes are perpendicular to one another. By using a transmitting method that uses such magnetic induction characteristics, the relative angle of the frame unit 1B to the main unit 1A can be detected. Further, specifically, the wireless transmitting unit 45 of the above-mentioned main unit 1A is configured with a transmission antenna in the form of two orthogonal magnetic dipoles, and the wireless transmitting unit 46 of the above-mentioned frame unit 1B is configured with a transmission antenna in the form of three orthogonal magnetic dipoles.

The wireless transmission between the frame unit 1B and the main unit 1A using the above described wireless transmitting units 45 and 46 is accomplished by for example using the same frequency wave of a low frequency for both sending and receiving, and dividing into a time axis, and switching between sending and receiving at a high speed. The relative tilt of the above-mentioned frame unit 1B to the main unit 1A is defined by each magnetic dipole antenna on one side of the main unit 1A and the frame unit 1B measuring the inducted current signal of each magnetic dipole antenna on the other side.

Further, on one hand on the above-mentioned main unit 1A is provided a shutter button 7a which is picture-taking instruction input means, and on the above-mentioned frame unit 1B is also provided a shutter button 7b which is picture-taking instruction input means.

Further, the power for the frame unit 1B is transmitted wirelessly for example from the main unit 1A. However, this does not need to be a limitation, and a detachable battery may be built into the frame unit 1B.

When performing picture-taking with this type of camera configuration, first the main unit 1A is placed so that the photographing optical system 11 thereof approximately points toward the subject. Then, the photographer holds only the frame unit 1B by hand, and the composition of the subject is determined via the viewfinder 5.

In this case, the information of the subject range observed by the photographer and the angle information of the frame unit 1B to the main unit 1A is continuously transmitted to the main unit 1A side via the above-mentioned wireless transmitting units 45 and 46, and as the main unit 1A is described, the photographing range is determined based on this information, and continuously accumulates photographed images to the frame buffer that is capable of recording the image data of several frames worth.

Then, when the photographer touches the shutter button 7b on the frame unit 1B, the picture-taking command is transmitted to the main unit 1A side, and the newest frame image is recorded on the above-mentioned recording medium 14 as a file.

Further, as with the above-described second embodiment, this camera can perform picture-taking with the individual main unit 1A by itself, and the photographing operation is performed by touching the above-mentioned shutter button 7a.

Now, when the separately configured frame unit 1B and main unit 1A communicate with each other, wireless transmission is most desirable when considering how to arrange the equipment and so forth, and therefore wireless communication is used in the example as described above, however, this does not need to be a limitation, and the camera can be configured using cable communication.

According to this third embodiment, in addition to realizing almost identical advantages of the above-described first and second embodiments, composition decisions and photographing operations can be easily performed because picture-taking can be performed by holding only the frame unit in the hand.

Further, even if the separated frame unit 1B is tilted as to the main unit 1A, the tilt can be detected, and an image with a composition taking the tilt into account can be taken.

Fourth Embodiment

FIG. 14 is a perspective diagram according to a fourth embodiment of the present invention, illustrating an example of a camera where the viewfinder is configured using a transmissive-type display device.

With regard to this fourth embodiment, the portions which are the same as those in the above-described first through third embodiments will be denoted with the same reference numerals and description thereof will be omitted, and primarily only the different portions will be described.

This camera is configured wherein the viewfinder 5 is a transmissive-type display device, for example a transmissive-type LCD.

In other words, the frame unit 1b comprises a transmissive type display device 52 within an outer frame 51, and for example on the upper right portion a view-finding operating member 53 is provided.

The above-mentioned transmissive type display device 52 displays a transparent region 52a in the center, and displays a semi-transparent region 52b on the outer side of this transparent region 52a, and the boundary line 5a of these regions defines the range of the viewfinder 5.

The above-mentioned view-finding operating member 53 is configured as a lever member that can move in four directions lengthwise and crosswise, for example.

Further, according to the example illustrated in FIG. 14, the back-face image-pickup device 6b is positioned on the camera main unit 2 side.

According to this type of configuration, when the lever of the above-mentioned view-finding operating member 53 is operated upwards the above-mentioned viewfinder 5 is expanded in the vertical direction, and when this lever is operated downwards the viewfinder 5 shrinks in the vertical direction. Similarly, when the lever of the above-mentioned view-finding operating member 53 is operated to the right the above-mentioned viewfinder 5 is expanded in the horizontal direction, and when this lever is operated to the left the viewfinder 5 shrinks in the horizontal direction. Now, the functionality appropriation for the lever operation direction does not need to be limited to these, and may use another type of appropriation.

Further, operation of the lever in not only the four directions, but also in diagonal directions, may be configured, to facilitate even easier operation.

Further, in the example illustrated in this FIG. 14, a lever member is used to operate the range of the viewfinder 5, but this does not need to be a limitation, and it goes without saying that the range of the viewfinder 5 may be operated using for example a touch panel type transmissive display device with a separate pen to operate.

Now, the transparent region 52a as described above is basically for allowing light to pass through, but as described in the first embodiment, a grid of index lines or golden ratio index lines serving as a reference for determining the composition may be used for display, and not only index lines, but shapes, designs, colors, or a combination thereof that would be an aid to determining the composition may be used for display.

According to this type of fourth embodiment, almost identical advantages of the above-described first through third embodiments can also be realized by using a transmissive type liquid crystal display device to configure the viewfinder.

Fifth Embodiment

Figure 15A:
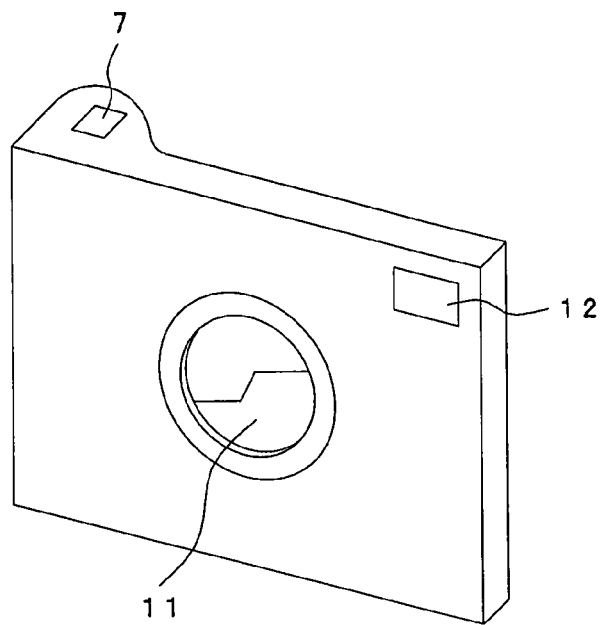
FIG. 15A is a perspective diagram according to a fifth embodiment of the present invention, illustrating the external view of the camera from the front face side.
Figure 15B:
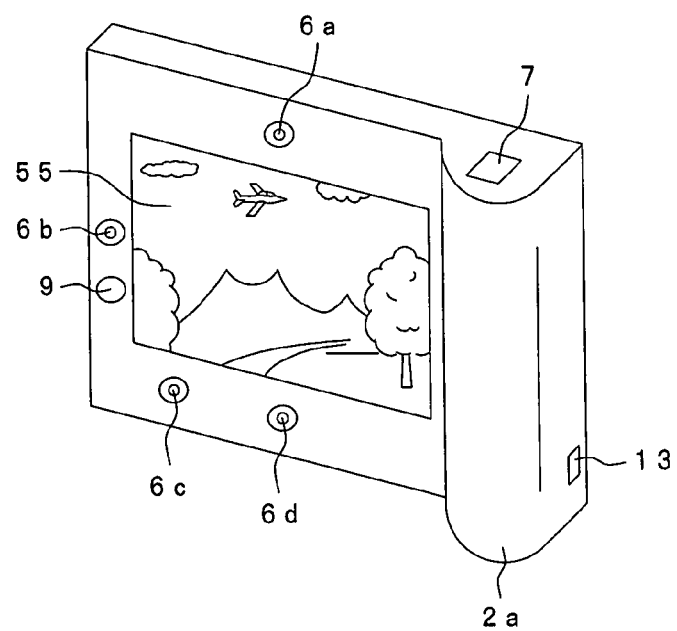
FIG. 15B is a perspective diagram according to the fifth embodiment, illustrating the external view of the camera from the back side.

FIG. 15A and FIG. 15B illustrate a fifth embodiment of the present invention, wherein FIG. 15A is a perspective diagram illustrating the external view of the camera from the front face side, and FIG. 15B is a perspective diagram illustrating the external view of the camera from the back side.

With regard to this fifth embodiment, the portions which are the same as those of the above-described first through fourth embodiments will be denoted with the same reference numerals and the description thereof will be omitted, and primarily only the different portions will be described.

This camera according to the fifth embodiment is configured wherein the viewfinder is a non-transmissive type display device.

In other words, as illustrated in FIG. 15B, a non-transmissive type display device 55 is positioned on the back face of the camera. Further, surrounding this display device 55 are positioned back-face image-pickup devices 6a through 6d, and in this fifth embodiment, the number of back-face image-pickup devices is increased to four. Further, the back illumination unit 9 being positioned on the periphery of the above-mentioned display device 55 is similar to that described above.

Then, the photographing range viewed by the photographer is estimated, based on the information of the eye position of the photographer that is detected by the above-mentioned back-face image-pickup devices 6a through 6d, zoom position or photographing direction is adjusted by the photographing optical system 11 illustrated in FIG. 15A or the above-mentioned image processing unit 24, so that the image in the estimated photographing range can be obtained, and the image of the estimated photographing range is captured, and that image is displayed on the display device 55, thereby accomplishing the function of a viewfinder.

With this type of camera that provides a non-transmissive type display device 55, fairly high-level control technology is necessary because of the need to display the same image as that being observed via the light transmitting opening of the same size as this display device 55.

According to this type of fifth embodiment, almost identical advantages of the above-described first through fourth embodiments can also be realized by using a non-transmissive type display device.

Sixth Embodiment

Figure 16A:
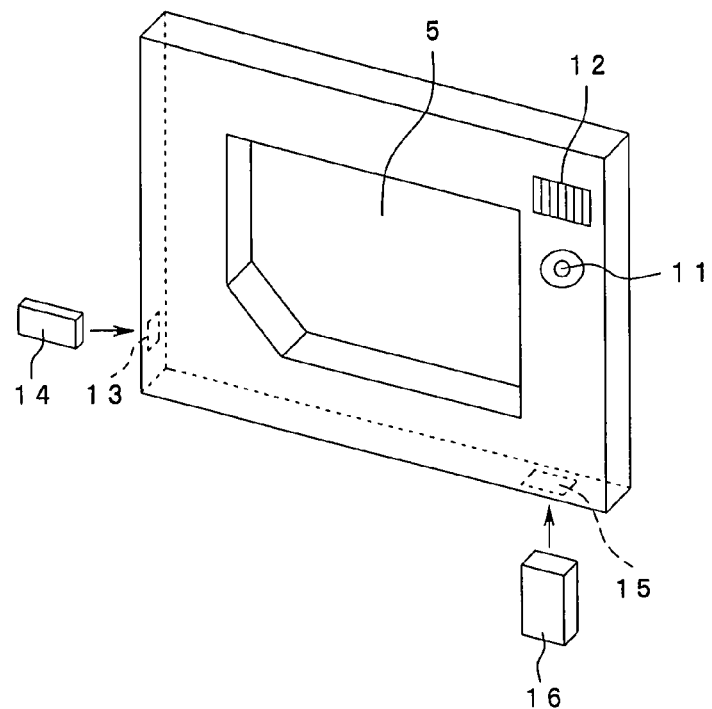
FIG. 16A is a perspective diagram according to a sixth embodiment of the present invention, illustrating the external view of the camera from the front face side.
Figure 16B:
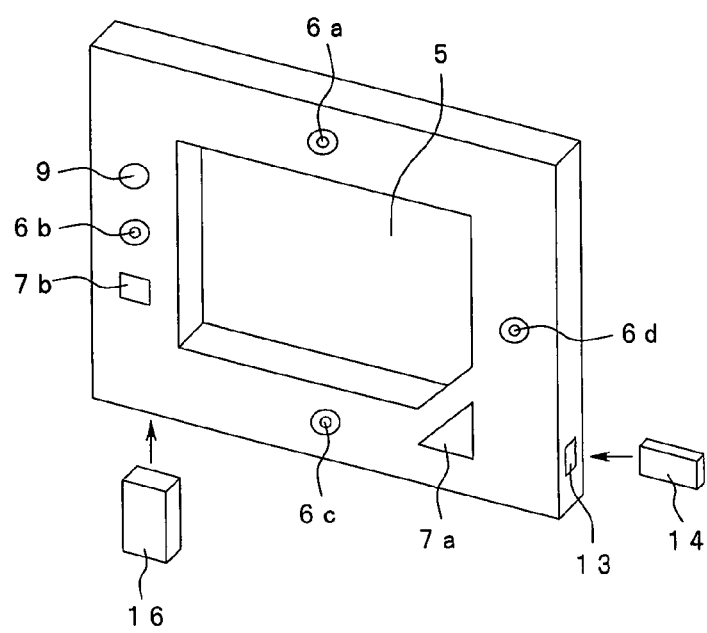
FIG. 16B is a perspective diagram according to the sixth embodiment, illustrating the external appearance of the camera from the back side.

FIG. 16A and FIG. 16B illustrate a sixth embodiment of the present invention, wherein FIG. 16A is a perspective diagram illustrating the external view of the camera from the front face side, and FIG. 16B is a perspective diagram illustrating the external view of the camera from the back side.

With regard to this sixth embodiment, the portions the same as those in the above-described first through fifth embodiments will be denoted with the same reference numerals and the description will be omitted, and primarily only the different portions will be described.

The camera according to this sixth embodiment comprises a viewfinder 5 of a fixed size.

Therefore, this camera does not combine multiple L-shaped frames, but rather comprises a fixed viewfinder 5 formed of an approximately rectangle shape.

Also, the photographing optical system 11 comprises for example a lens with a single focal point, and zooming operation is enabled only with an electronic zoom.

Further, similar to each of the above described embodiments, a flash unit 12 is positioned on the upper side of the above-mentioned photographing optical system 11, a battery attaching unit 15 for attaching a battery 16 is positioned on the bottom side, a media slot 13 for attaching a recording medium 14 is positioned on the side face, and the above-mentioned back-face image-pickup devices 6a through 6d and the back illumination unit 9 are positioned on the back face.

Further, on the lower right corner of the back face of this camera a first shutter button 7a is positioned, and on the left side a second shutter button 7b is positioned, and is so configured that a photographing operation can be performed with either the right hand or the left hand as desired, or a photographing operation can be performed easily when the camera is held in a vertical position or held in a horizontal position.

The operation of image-pickup when using this type of camera is approximately similar to the photographing operation of the above-described embodiments, but because the size of the viewfinder 5 cannot be changed, change to the photographing range relating to zooming operation is performed by stretching out or bringing back the arm that is holding the camera, and holding the viewfinder 5 closer to or farther from the eye.

Then, when the distance and direction from the predetermined reference position of the camera to the eye is detected by the above-mentioned back-face image-pickup devices 6a through 6d, electronic zooming is performed by the image processing unit 24 so that the photographing range will correspond to this distance, and changes are made to the direction of the center axis of the photographing luminous flux to be this direction, as illustrated for example, in the above-mentioned FIG. 10A, FIG. 10B, FIG. 10C or FIG. 11A, FIG. 11B.

Now, in order to simplify the configuration here, the photographing optical system 11 has been described as having a single focal point, but it goes without saying that an optical system capable of zooming can be used.

Further, a photographing optical system 11 that can change the photographing direction is assumed in the description above, but the photographing direction may be optically unchangeable. When doing so, electronic changes to the photographing direction can be made by setting the cropping range of the image. By utilizing such a configuration, the cost of the camera can be lowered even further.

According to this type of sixth embodiment, almost identical advantages of the above-described first through fifth embodiments can be realized, and also by fixing the viewfinder and setting the photographing optical system as a single vision, a camera can be configured at an even lower cost.

Now, the technology for detecting the eye of the photographer used the above-described back-face image-pickup devices 6a through 6d does not need to be limited to the type of camera that uses a viewfinder to determine the composition, and can be applied to a normal camera as well.

Figure 17A:
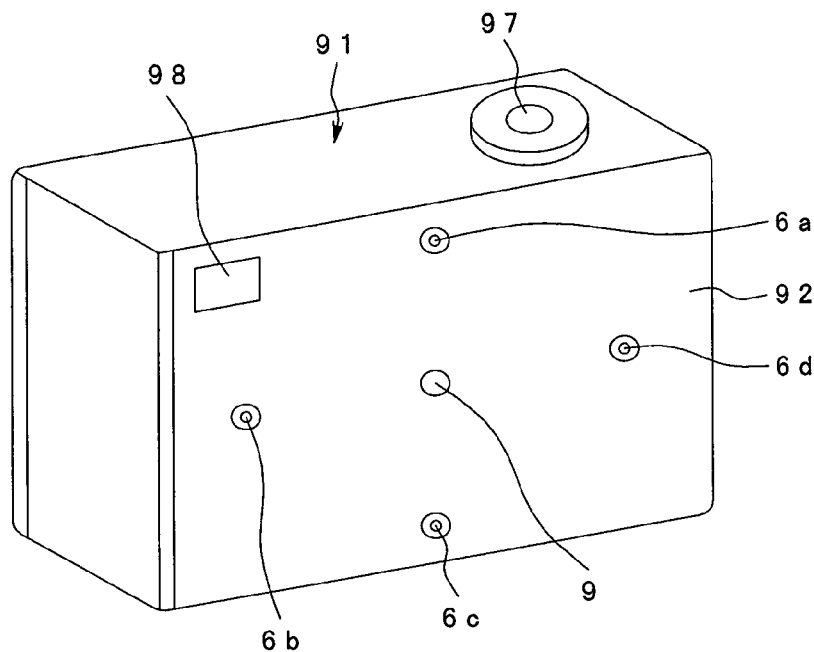
FIG. 17A is a rear view diagram illustrating a normal camera that has applied the back-face image-pickup unit relating to the present invention.
Figure 17B:
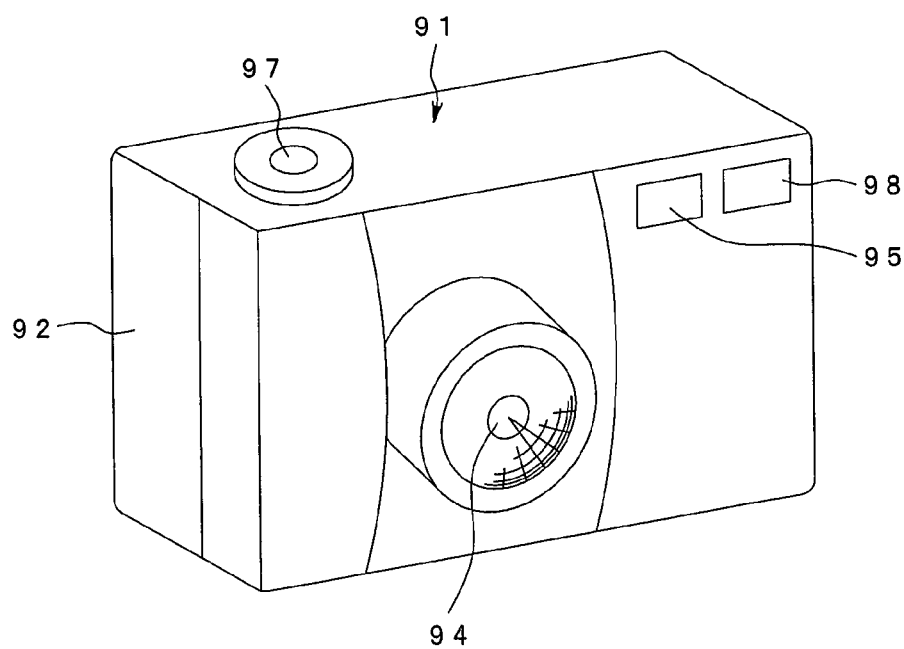
FIG. 17B is a front view diagram illustrating a normal camera that has applied the back-face image-pickup unit relating to the present invention.
Figure 18:
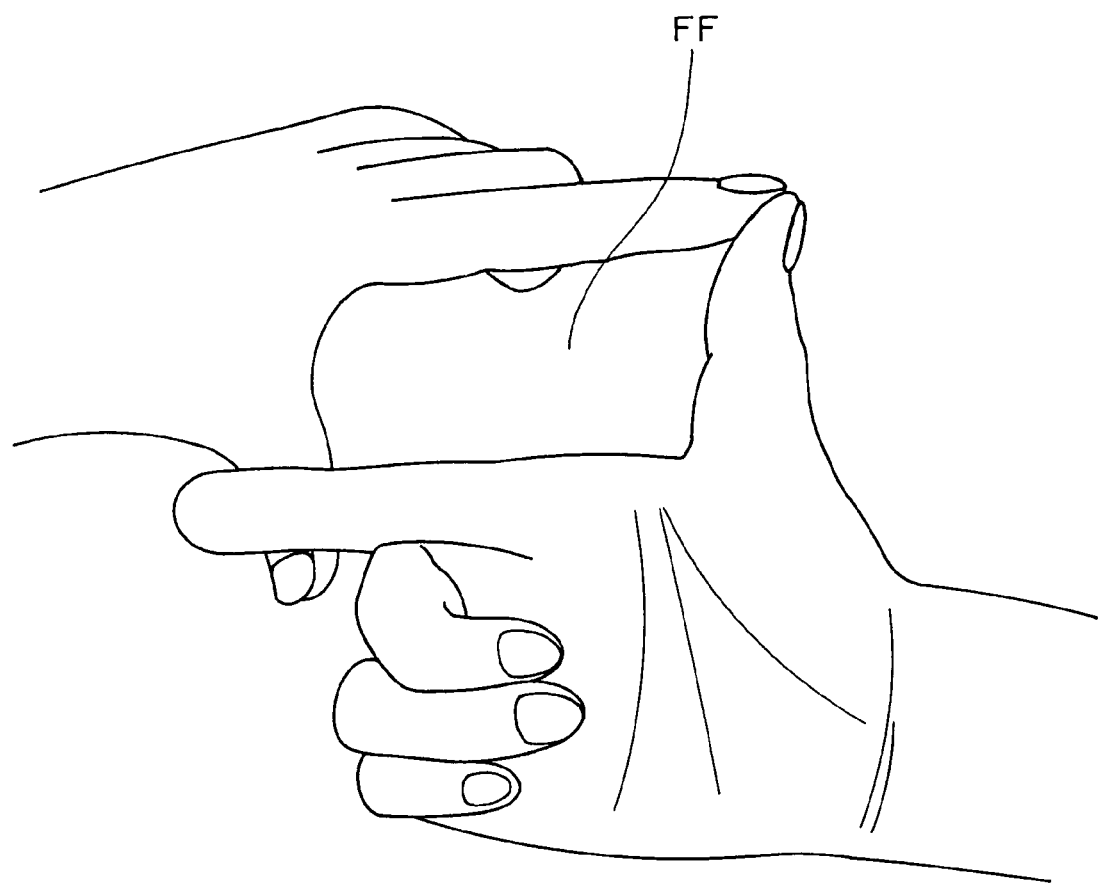
FIG. 18 is a diagram illustrating the situation wherein framing is determined using a finger frame.

FIG. 17A is a rear view diagram illustrating a normal camera that has applied the back-face image-pickup unit, and FIG. 17B is a front view diagram illustrating a normal camera that has applied the back-face image-pickup unit.

This camera 91 comprises a photographing optical system 94 and a flash unit 95 on the front face side of the camera main unit 92, a shutter button 97 on the upper face, and further, the optical finder 98 is positioned with the object side on the front face side and the eye side on the back face side, each exposed, as illustrated in FIG. 17B.

Also, on the back face side of this camera 91, the back-face image-pickup devices 6a through 6d as described above, and a back illuminating unit 9, are positioned, as illustrated in FIG. 17A.

This type of camera 91 can also be effectively used for detecting the eye position of the photographer, and using the detected information for picture-taking preparation operations or other processing.

Now, each of the above-described embodiments primarily describe a camera that electronically takes still images, such as a digital camera, but the present invention is not restricted to this, and can be applied to a camera that electronically takes moving images such as a video camera, or can be applies to a silver salt camera that performs exposure onto a silver salt film, or can be applied to various equipment having camera functions (for example, a cellular telephone with a camera function).

Further, while each of the above-described embodiments uses a rectangular frame as a viewfinder, the present invention is not limited to a rectangular viewfinder, and various shapes of viewfinders may be used, in the same way as artwork that is drawn to be framed in for example a round-shaped or oval-shaped frame.

Having described the preferred embodiments of the invention referring to the accompanying drawings, it should be understood that the present invention is not limited to those precise embodiments and various changes and modifications thereof could be made by one skilled in the art without departing from the spirit or scope of the invention as defined in the appended claims.

What is claimed is:

1. An imaging apparatus comprising:
a frame for setting a two-dimensional region for defining object range within a field of view seen by a user;
eye position detector for detecting a position of an eye of the user relative to the frame;
a camera system for generating an electronic image having a photographing range from a subject;
wherein the imaging apparatus adjusts the photographing range automatically and without user intervention in such a way that the photographing range generally matches the object range.

2. The imaging apparatus according to claim 1, wherein the camera system comprises
optical lenses for forming an optical subject image of the subject; and
an electronic image capturing device for converting the optical subject image into the electronic image.

3. The imaging apparatus according to claim 1, wherein the frame is capable of changing settings of the two-dimensional region, and
wherein geometric properties of the two-dimensional region are used to adjust the photographing range.

4. The imaging apparatus according to claim 3, wherein the two-dimensional region is rectangular, and
the geometric properties comprise aspect ratio of the two-dimensional region, and the photographing range is adjusted based upon the aspect ratio.

5. The imaging apparatus according to claim 4, wherein the frame comprises a pair of L-shaped frame portions facing one another and capable of moving relative to each other, wherein the two-dimensional region is defined by a rectangle formed by the L-shaped frame portions.

6. The imaging apparatus according to claim 5, wherein the L-shaped frames can be folded up.

7. The imaging apparatus according to claim 1, wherein the frame is configured by a display device for setting the two-dimensional region.

8. The imaging apparatus according to claim 7, wherein the display displays the two-dimensional region.

9. The imaging apparatus according to claim 8, wherein the display displays an image based on the electronic image with the adjusted photographing range.

10. The imaging apparatus according to claim 1, wherein the frame does not contain a display but can be looked through.

11. The imaging apparatus according to claim 1, wherein:
the two-dimensional region is a rectangle having a vertical size and a horizontal size;
the position of an eye comprises distance between the eye and a predetermined reference position of the frame; and
the photographing range is adjusted based upon said distance, the vertical size, and the horizontal size.

12. The imaging apparatus according to claim 11, wherein:
the position off an eye further comprises directional angles of the eye with respect to the reference position; and
the photographing range is adjusted based on the directional angles.

13. The imaging apparatus according to claim 11, wherein:
the imaging apparatus comprises two or more back-face image-pickup devices which capture electronic images of the user; and
the distance is calculated based upon said images of the user.

14. The imaging apparatus according to claim 12, wherein:
the imaging apparatus comprises two or more back-face image-pickup devices which capture electronic images of the user; and
the distance and the directional angles are calculated based upon said images of the user.

15. The imaging apparatus according to claim 13, wherein:
the images of the user are analyzed to detect eyes of the user and to select the eye for determining the distance in such a way that:
if only one detected eye is open, this eye is selected, and
if multiple detected eyes are open, the eye that is closest to the predetermined reference position is selected.

16. The imaging apparatus according to claim 2, wherein at least one of the optical lenses and the electronic image capturing device are capable of changing position within the camera system;
and wherein a center position of the photographing range is adjusted by said changing of position.

17. The imaging apparatus according to claim 2, wherein the electronic image is generated by cropping a range within an electronic image of the optical subject image, and wherein a center position of the photographing range is adjusted by adjusting a center position of the cropping range.

18. The imaging apparatus according to claim 2, wherein:
the optical lenses comprise a zoom optical system capable of changing focal length of the optical lenses;
the position of an eye comprises distance between the eye and a predetermined reference position of the frame; and wherein
the photographing range is adjusted based upon said distance by changing the focal length of the zoom optical system.

19. The imaging apparatus according to claim 1, wherein the frame and the eye position detector are included in a first body, which is separate and/or detachable from a second body comprising the camera system.

20. The imaging apparatus according to claim 19, wherein:
the first body transmits to the second body information of the position of an eye of the user relative to the frame, and
the second body comprises circuits for adjusting the photographing range based upon the received information.

21. The imaging apparatus according to claim 1, wherein the frame can be folded up.

22. An imaging apparatus comprising:
a framing means for setting a two-dimensional region which defines object range within a field of view seen by a user;
an eye position detecting means for detecting a position of an eye of the user relative to the framing means;
means for generating an optical subject image of a subject to be photographed;
means for generating an electronic image based upon the optical subject image, said electronic image defining a photographing range; and
means for adjusting for adjusting automatically and without user intervention the photographing range so that the photographing range generally matches the object range defined by the framing means, based on information of the position of the eye.

23. The imaging apparatus according to claim 22, wherein the information of the position of the eye comprises distance and directional angles of the eye from a predetermined reference point of the framing means.

24. A camera comprising:
adjustable framing means for setting, in accordance with a user adjustment, a framing boundary defining a two-dimensional region for defining an object range within a field of view;
eye position detecting means for detecting the position of the eye relative to the framing means;
a photographing optical system for forming an image of the subject image;
photographing means for photographing a subject image that is formed by the photographing optical system; and
photographing range adjustment means for adjusting the photographing range so that the photographing range by the photographing means generally matches the object range observed via the two-dimensional region, based on the information of the framing boundary defining the two-dimensional region that is set by the adjustable framing means and the information of the eye position detected by the eye position detecting means.

* * * * *